(12) United States Patent
Ninomiya et al.

(10) Patent No.: US 12,546,607 B2
(45) Date of Patent: Feb. 10, 2026

(54) INFORMATION PROCESSING DEVICE

(71) Applicant: HITACHI ASTEMO, LTD., Hitachinaka (JP)

(72) Inventors: Takeru Ninomiya, Tokyo (JP); Hideaki Kido, Tokyo (JP); Tatsuhiko Monji, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 323 days.

(21) Appl. No.: 18/010,661

(22) PCT Filed: May 31, 2021

(86) PCT No.: PCT/JP2021/020670
§ 371 (c)(1),
(2) Date: Dec. 15, 2022

(87) PCT Pub. No.: WO2022/018970
PCT Pub. Date: Jan. 27, 2022

(65) Prior Publication Data
US 2023/0236021 A1 Jul. 27, 2023

(30) Foreign Application Priority Data

Jul. 20, 2020 (JP) ................................ 2020-123888

(51) Int. Cl.
*G01C 21/30* (2006.01)
(52) U.S. Cl.
CPC .................................... *G01C 21/30* (2013.01)
(58) Field of Classification Search
CPC ..................................................... G01C 21/30
See application file for complete search history.

(56) References Cited

U.S. PATENT DOCUMENTS 10,384,679 B2 * 8/2019 Fujita .................. G01C 21/3667
11,175,661 B2 * 11/2021 Satake ............ B60W 60/00186
(Continued)

FOREIGN PATENT DOCUMENTS

DE 102013201545 A1 * 7/2014 ......... G06K 9/00791
EP 2 325 824 A1 5/2011
(Continued)

OTHER PUBLICATIONS

English translation of the International Search Report for PCT/JP2021/020670, dated Aug. 17, 2021, 2 pages.
(Continued)

*Primary Examiner* — Anil K Bhargava
(74) *Attorney, Agent, or Firm* — Foley & Lardner LLP

(57) ABSTRACT

An information processing device estimates a road shape of a road on which a host vehicle travels based on map information acquired from a map information unit and sensor information acquired from a sensor unit. The information processing device includes a sensor resolution characteristic management unit which manages a sensor resolution characteristic of the sensor unit, which corresponds to a distance from a host vehicle position of the host vehicle to a position where the intersection shape changes, an appearance prediction unit which predicts an appearance of the road corresponding to the distance based on the sensor resolution characteristic acquired from the sensor resolution characteristic management unit, and a model generation unit which generates a road model obtained by modeling the road based on the appearance of the road predicted by the appearance prediction unit.

15 Claims, 17 Drawing Sheets

(56) References Cited

U.S. PATENT DOCUMENTS

| | | | | |
|---|---|---|---|---|
| 11,391,574 B2 * | 7/2022 | Parchami | | G01S 17/86 |
| 11,521,371 B2 * | 12/2022 | Omari | | G06V 10/758 |
| 11,568,434 B2 * | 1/2023 | Bax | | B60Q 9/00 |
| 11,781,870 B2 * | 10/2023 | Shashua | | G06V 20/584 |
| | | | | 701/423 |
| 11,868,136 B2 * | 1/2024 | Benisch | | G05D 1/229 |
| 11,982,540 B2 * | 5/2024 | Abramson | | G06V 20/584 |
| 12,277,095 B2 * | 4/2025 | Dong | | G06F 18/2413 |
| 2011/0222732 A1 | 9/2011 | Higuchi et al. | | |
| 2012/0185167 A1 * | 7/2012 | Higuchi | | G06V 20/588 |
| | | | | 382/104 |
| 2018/0039270 A1 * | 2/2018 | Satake | | B60W 60/00186 |
| 2019/0250639 A1 * | 8/2019 | Xu | | G08G 1/0145 |
| 2020/0023842 A1 * | 1/2020 | Gutierrez | | G06V 10/82 |
| 2020/0309536 A1 * | 10/2020 | Omari | | G07C 5/008 |
| 2021/0142667 A1 * | 5/2021 | Choi | | G08G 1/0969 |
| 2021/0364319 A1 * | 11/2021 | Abramson | | G06V 20/584 |
| 2022/0230450 A1 * | 7/2022 | Yin | | G06V 10/82 |
| 2022/0383743 A1 * | 12/2022 | Oren | | G08G 1/096725 |
| 2022/0388534 A1 * | 12/2022 | Schneemann | | G05D 1/0088 |
| 2024/0104932 A1 * | 3/2024 | Kirigan | | G06V 20/56 |
| 2025/0182498 A1 * | 6/2025 | Musk | | G06V 10/803 |

FOREIGN PATENT DOCUMENTS

| | | | | |
|---|---|---|---|---|
| EP | 2951804 A1 | 12/2015 | | |
| JP | 2000-030198 A | 1/2000 | | |
| WO | WO-2010032532 A1 * | 3/2010 | | B60W 30/14 |
| WO | WO-2014/118178 A | 8/2014 | | |

OTHER PUBLICATIONS

Machine generated English translation of the abstract for DE102013201545, published on Jul. 31, 2014, 1 page.

Extended European Search Report issued in corresponding EP Application No. 21846610.0, dated Jul. 26, 2024 (8 pages).

* cited by examiner

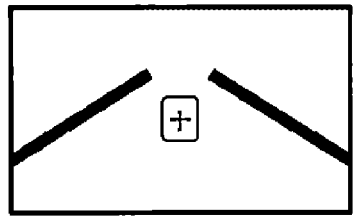
(a) CROSS INTERSECTION DISTANT FROM HOST VEHICLE THAN FIRST DISTANCE
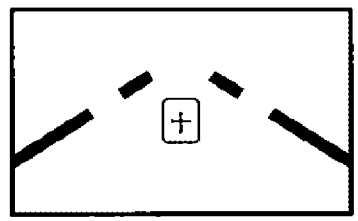
(b) IMMEDIATELY AFTER DISTANCE FROM HOST VEHICLE FALLS BELOW FIRST DISTANCE
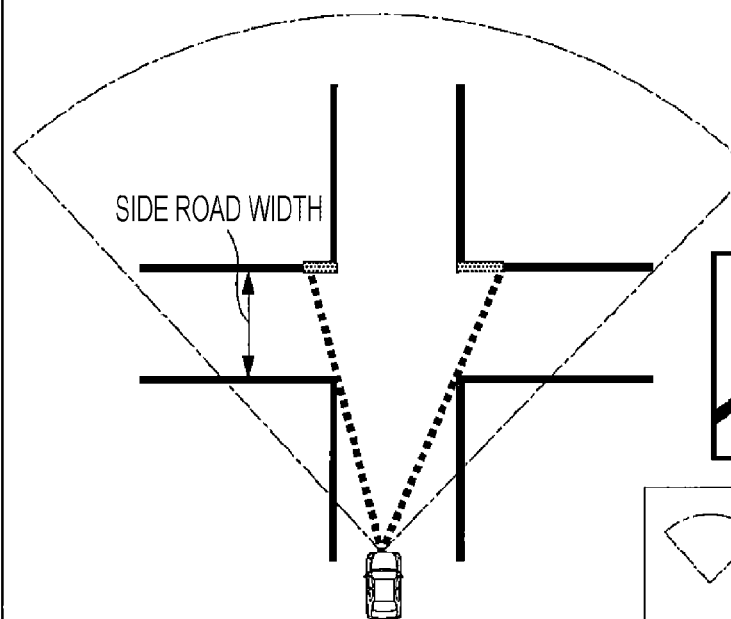
(c) CROSS INTERSECTION NEAR HOST VEHICLE
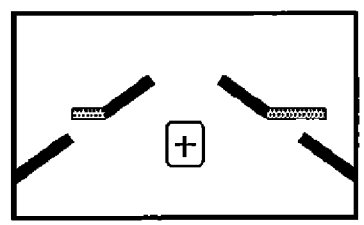
▱ : IN VISUAL FIELD RANGE OF SENSOR
••••• : IN OBSERVATION RANGE OF SENSOR
▰▰▰ : ROAD BOUNDARY OF SIDE ROAD CONSTITUTING INTERSECTION
FIG. 12

FIG. 14A

| FOR EACH ROAD \ FOR EACH AREA | TYPE OF ROAD | |
|---|---|---|
| | SUBURBAN AREA PART | PRINCIPAL CITY PART |
| AUTOMOBILE EXPRESSWAY AND AUTOMOBILE ROAD | FIRST TYPE | SECOND TYPE |
| OTHER ROADS | THIRD TYPE | FOURTH TYPE |

FIG. 14B

| PLANNED TRAFFIC VOLUME (VEHICLES/DAY) | | GRADE OF ROAD | | | | |
|---|---|---|---|---|---|---|
| TYPE OF ROAD | TERRAIN OF AREA | 20,000 OR MORE | 4,000 OR MORE AND LESS THAN 20,000 | 1,500 OR MORE AND LESS THAN 4,000 | 500 OR MORE AND LESS THAN 1,500 | LESS THAN 500 |
| GENERAL ROAD | FLATLAND PART | FIRST GRADE | SECOND GRADE | THIRD GRADE | | |
| | MOUNTAINOUS REGION | SECOND GRADE | THIRD GRADE | FOURTH GRADE | | |
| PREFECTURAL ROAD | FLATLAND PART | SECOND GRADE | | THIRD GRADE | | |
| | MOUNTAINOUS REGION | THIRD GRADE | | FOURTH GRADE | | |
| MUNICIPAL ROAD | FLATLAND PART | SECOND GRADE | | THIRD GRADE | FOURTH GRADE | FIFTH GRADE |
| | MOUNTAINOUS REGION | THIRD GRADE | | FOURTH GRADE | | FIFTH GRADE |

FIG. 15

| CLASSIFICATION OF TYPE AND GRADE OF ROAD | | LANE WIDTH OF NORMAL ROAD UNIT: m |
|---|---|---|
| FIRST TYPE | FIRST GRADE | 3.50 |
| | SECOND GRADE | 3.50 |
| | THIRD GRADE | 3.50 |
| | FOURTH GRADE | 3.25 |
| SECOND TYPE | FIRST GRADE | 3.50 |
| | SECOND GRADE | 3.25 |
| THIRD TYPE | FIRST GRADE | 3.50 |
| | SECOND GRADE | 3.25 |
| | THIRD GRADE | 3.00 |
| | FOURTH GRADE | 2.75 |
| FOURTH TYPE | FIRST GRADE | 3.25 |
| | SECOND GRADE, THIRD GRADE | 3.00 |

FIG. 16

| CLASSIFICATION OF TYPE AND GRADE OF ROAD | | WIDTH OF ROAD SHOULDER PROVIDED ON LEFT SIDE OF NORMAL ROAD UNIT: m | WIDTH OF ROAD SHOULDER PROVIDED ON RIGHT SIDE OF NORMAL ROAD UNIT: m |
|---|---|---|---|
| FIRST TYPE | FIRST AND SECOND GRADES | 2.5 | 1.25 |
| | THIRD AND FOURTH GRADES | 1.75 | 0.75 |
| SECOND TYPE | | 1.25 | 0.75 |
| THIRD TYPE | FIRST GRADE | 1.25 | 0.5 |
| | SECOND GRADE TO FOURTH GRADE | 0.75 | |
| | FIFTH GRADE | 0.5 | |
| FOURTH TYPE | | 0.5 | 0.5 |

FIG. 17A

| TYPE OF ROAD | TYPE | NUMBER OF LANES ON ONE SIDE | LANE WIDTH [m] | ROADSIDE ZONE [m] |
|---|---|---|---|---|
| HIGHWAY | FIRST TYPE | 4 | 3.75 | 2.5 |
| | SECOND TYPE | 3 | 3.5 | 1.75 |
| GENERAL ROAD | THIRD TYPE | 2 | 3.25 | 1.25 |
| | FOURTH TYPE | 1 | 3.0 | 0.75 |

FIG. 17B

| GRADE | NUMBER OF LANES ON ONE SIDE | LANE WIDTH [m] | DESIGNED SPEED [km/h] | ROADSIDE ZONE [m] |
|---|---|---|---|---|
| FIRST GRADE | 4 | 3.75 | 80 | 2.5 |
| SECOND GRADE | 3 | 3.5 | 80 | 1.75 |
| THIRD GRADE | 2 | 3.25 | 60 | 1.25 |
| FOURTH GRADE | 1 | 3.0 | 50 | 0.75 |
| FIFTH GRADE | 1 | 2.75 | 40 | 0.5 |

FIG. 18A

| TYPE OF ROAD | NUMBER OF LANES ON ONE SIDE | LANE WIDTH [m] | DESIGNED SPEED [km/h] | ROADSIDE ZONE [m] |
|---|---|---|---|---|
| HIGHWAY | 4 | 3.75 | 80 | 2.5 |
| CAPITAL FREEWAY | 3 | 3.5 | 80 | 1.75 |
| NATIONAL ROAD | 2 | 3.25 | 60 | 1.25 |
| PREFECTURAL ROAD | 1 | 3.0 | 50 | 0.75 |
| OTHERS | 1 | 2.75 | 40 | 0.5 |

FIG. 18B

| LIMIT SPEED [Km/h] | NUMBER OF LANES ON ONE SIDE | LANE WIDTH [m] | DESIGNED SPEED [km/h] | ROADSIDE ZONE [m] |
|---|---|---|---|---|
| 100 | 4 | 3.75 | 80 | 2.5 |
| 80 | 3 | 3.5 | 80 | 1.75 |
| 60 | 2 | 3.25 | 60 | 1.25 |
| 50 | 1 | 3.0 | 50 | 0.75 |
| 40 | 1 | 2.75 | 40 | 0.5 |

INFORMATION PROCESSING DEVICE

TECHNICAL FIELD

The present invention relates to an information processing device capable of correctly recognizing a road around a host vehicle, for example.

BACKGROUND ART

Commercialization of a preventive safety technology in an automobile field has entered a widespread stage. Multi-functionalization and high functionality have been achieved, and the corresponding scene has been expanded. For example, a complicated scene such as a general road on which a vehicle travels and an intersection is assumed as the corresponding scene.

In recent years, the corresponding scene of the vehicle has been expanded, and in particular, it has become an important problem that a recognition device mounted on the vehicle can correctly recognize, for example, an intersection where roads intersect. However, since the technology of the related art is basically intended for vehicle control on a single road, the recognition device recognizes a shape of the road by using only information obtained from a sensor such as a camera mounted on the vehicle. However, it is difficult for the recognition device of the related art to appropriately recognize a complicated road shape such as an intersection only with information obtained only from the sensor. Thus, it has been considered that the recognition device can recognize the complicated road shape by the technology disclosed in PTL 1.

PTL 1 describes "a recognition device including road shape pattern selection means for selecting a road shape pattern based on a position of a host vehicle detected by host vehicle position detection means and road map information stored in road map information storage means, and road shape recognition means for recognizing a road shape in front of a host vehicle based on detection information of front road shape information detection means and the road shape pattern selected by the road shape pattern selection means".

CITATION LIST

Patent Literature

PTL 1: JP 2000-30198 A

SUMMARY OF INVENTION

Technical Problem

In the recognition device disclosed in PTL 1, an intersection shape is estimated by modeling the intersection in front of the host vehicle based on a map in which a road structure is stored and fitting a model of the intersection to sensor information. However, in this technology, it has not been considered that how the intersection looks varies depending on a distance from the host vehicle position to the intersection due to an influence of a sensor resolution. In particular, inconsistency between an actual intersection shape and an intersection modeled by the recognition device (hereinafter, referred to as an "intersection model") occurs at an intersection present distant from the host vehicle. Thus, the recognition device can substantially estimate a shape of the intersection only when the host vehicle approaches the intersection. In addition, the recognition device has not been able to effectively utilize sensor information obtained from a sensor that observes the intersection present distant from the host vehicle position.

The present invention has been made in view of such a situation, and an object thereof is to correctly recognize a shape of a road on which a vehicle travels.

Solution to Problem

An information processing device according to the present invention estimates a road shape of a road on which a host vehicle travels based on map information acquired from a map information unit and sensor information acquired from a sensor unit. This information processing device includes a sensor resolution characteristic management unit which manages a sensor resolution characteristic of the sensor unit, which corresponds to a distance from a host vehicle position of the host vehicle to a position where the road shape changes, an appearance prediction unit which predicts an appearance of the road corresponding to the distance based on the sensor resolution characteristic acquired from the sensor resolution characteristic management unit, and a model generation unit which generates a road model obtained by modeling the road based on the appearance of the road predicted by the appearance prediction unit.

Advantageous Effects of Invention

According to the present invention, since the appearance of the road corresponding to the distance from the host vehicle is predicted based on the sensor resolution characteristic and the road model is generated, the shape of the road on which the vehicle travels can be correctly recognized.

Other objects, configurations, and effects will be made apparent in the descriptions of the following embodiments.

BRIEF DESCRIPTION OF DRAWINGS

FIG. 12 is a diagram illustrating an example in which a model selection unit according to the embodiment of the present invention switches and uses a plurality of models.

FIG. 14 illustrates tables showing an example of information on types of roads and grades of roads defined in the Road Structure Ordinance. FIG. 14A is a table in which kinds of roads and types of roads of type 1 to type 4 defined for each area are described. FIG. 14B is a table in which the grade of the road defined by a planned traffic volume per day with respect to the kind of the road and the terrain of the area is described.

FIG. 15 is a table showing examples of classification of types and grades of roads defined in the Road Structure Ordinance and lane widths of normal roads.

FIG. 16 is a table showing examples of classification of types and grades of roads defined in the Road Structure Ordinance and road shoulder widths of normal roads.

FIG. 17 illustrates tables showing an example of road information corresponding to the kind and the type of the road or the grade of the road. FIG. 17A is a table storing information on the number of lanes on one side, a lane width, and a roadside zone corresponding to the kind and the type of the road. FIG. 17B is a table storing information on the number of lanes on one side, a lane width, a designed speed, and a roadside zone corresponding to the grade of the road.

FIG. 18 illustrates tables showing an example of road information corresponding to the kind of the road or a speed limit. FIG. 18A is a table storing information on the number of lanes on one side, a lane width, a designed speed, and a roadside zone corresponding to the kind of the road. FIG. 18B is a table storing information on the number of lanes on one side, a lane width, a designed speed, and a roadside zone corresponding to the speed limit.

DESCRIPTION OF EMBODIMENTS

One Embodiment

Figure 1:
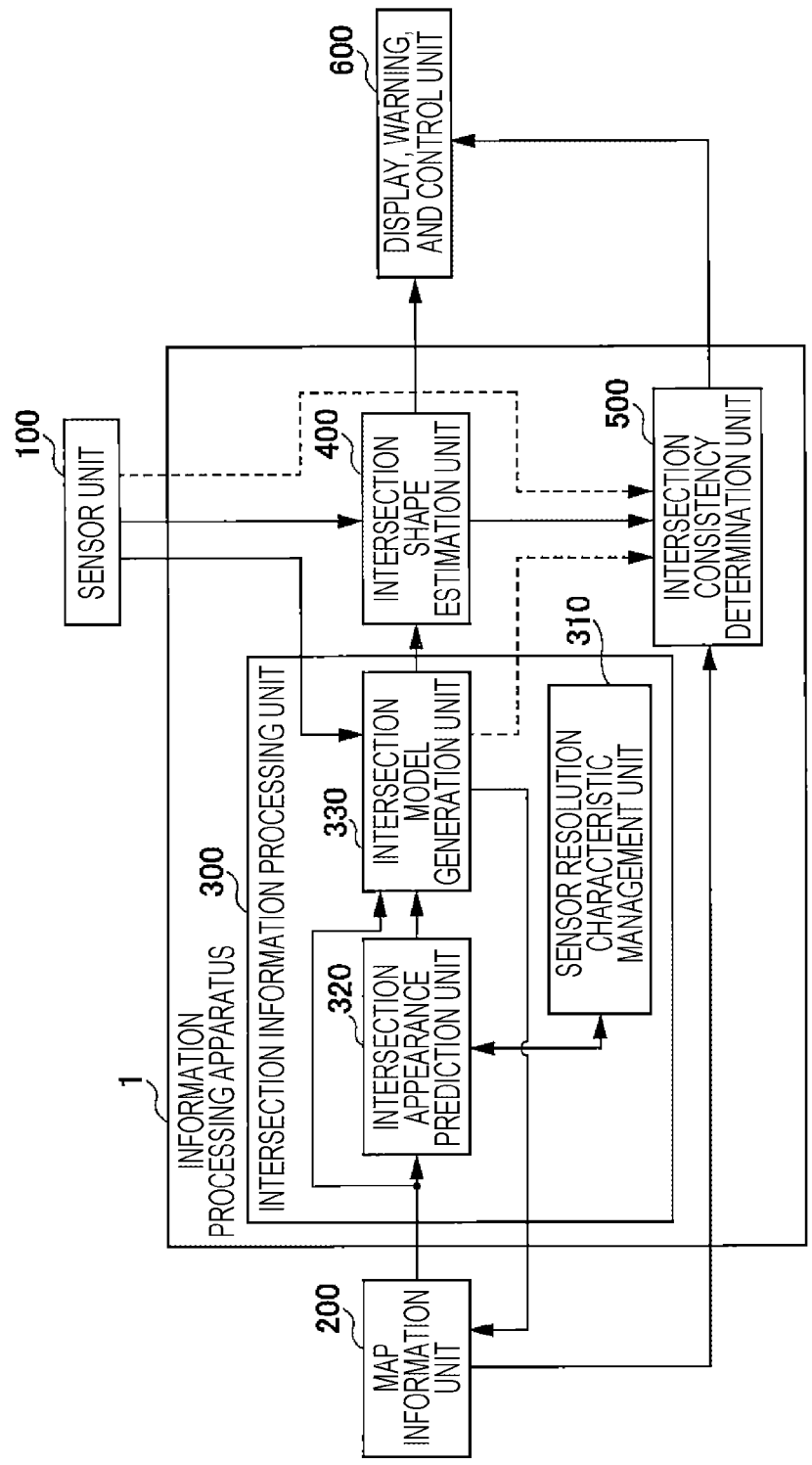
FIG. 1 is a block diagram illustrating an overall configuration example of an information processing device according to an embodiment of the present invention.

Hereinafter, a configuration example and an operation example of an information processing device according to an embodiment of the present invention will be described with reference to the accompanying drawings. Here, FIGS. 1 to 9 are diagrams for describing an internal configuration example of the information processing device according to the present embodiment, and FIG. 10 and subsequent drawings are diagrams for describing operations of functional units constituting the information processing device. However, FIGS. 14 to 18 illustrate information such as a type of a road defined in the Road Structure Ordinance of Japan. In the present specification and drawings, components having substantially the same function or configuration are denoted by the same reference numerals, and thus, the redundant description will be omitted.

<Overall Configuration Example of Information Processing Device>

First, an overall configuration example of the information processing device according to the present embodiment will be described with reference to FIG. 1.

FIG. 1 is a block diagram illustrating an overall configuration example of an information processing device 1. The information processing device 1 according to the present embodiment is mounted on a vehicle (not illustrated). Hereinafter, the vehicle on which the information processing device 1 is mounted is referred to as a "host vehicle". The information processing device (information processing device 1) estimates a road shape of a road on which the host vehicle travels based on map information acquired from a map information unit (map information unit 200) and sensor information acquired from a sensor unit (sensor unit 100). At this time, the information processing device 1 can recognize a road or the like around the vehicle by utilizing sensor information obtained from an in-vehicle sensor (hereinafter, abbreviated as "sensor") mounted on the vehicle and information of a map in which a road structure is stored, and can specify a host vehicle position. In addition, the information processing device 1 can also estimate a complicated road shape such as an intersection by utilizing the sensor information obtained from the sensor and the map storing the road structure. For example, the road of which the road shape is estimated by the information processing device 1 in the present embodiment is an intersection.

The information processing device 1 includes a sensor unit 100, a map information unit 200, an intersection information processing unit 300, an intersection shape estimation unit 400, an intersection consistency determination unit 500, and a display, warning, and control unit 600.

As the sensor unit 100, for example, an in-vehicle front sensor capable of observing an object, a road, or the like in a front direction of the vehicle is used. In the present embodiment, although a stereo camera is described as an example of a front sensor, the sensor may be, for example, a monocular camera or a laser imaging detection and ranging (Lidar). The sensor unit 100 outputs, as sensor information, front information of the vehicle observed by the sensor to the intersection information processing unit 300.

The map information unit 200 stores map information including information on a road on which the vehicle travels (map, road type, and Road Structure Ordinance). The information stored in the map information unit 200 may be, for example, map information used in a car navigation system mounted on the vehicle, or map information obtained by wireless communication from the Internet. These pieces of map information are stored in, for example, a mass storage medium such as a hard disk drive (HDD) or a solid state drive (SSD) mounted on the vehicle. In addition, the map information that can be acquired by the map information unit 200 may express a simple road shape, but also retains a function of storing and updating sensor information that is sensor information obtained by the sensor unit 100 sensing an observation range.

The intersection information processing unit 300 acquires map information in a certain section retained by the map information unit 200. Subsequently, the intersection information processing unit 300 analyzes a position where the host vehicle travels in this section and a traveling direction of the host vehicle, and acquires intersection information of an intersection present in front of the host vehicle from the map information unit 200. The intersection information processing unit 300 performs intersection information processing for generating an intersection model by using a default lane width, a road shoulder position, and the like from the acquired intersection information. The intersection model is an expression of a shape of an intersection by a mathematical expression or a point group.

When the map information includes information such as the number of lanes, the intersection information processing unit 300 generates the intersection model by using the information such as the number of lanes. In addition, when the map information does not include the information such as the number of lanes, the intersection information processing unit 300 generates an intersection model after the default number of lanes is determined based on upper limit vehicle speed information or the like included in the map information. Note that, the intersection information processing unit 300 may acquire information of the intersection model based on sensor information obtained by sensing by the sensor in the past.

The road shape estimation unit (intersection shape estimation unit 400) estimates the road shape (shape of the intersection) based on the road model (intersection model) and the sensor information, and outputs an estimation result. For example, the intersection shape estimation unit 400 performs, on the intersection model generated by the intersection information processing unit 300, estimation processing for recognizing the intersection shape by using the sensor information obtained from the sensor unit 100. Thus, the intersection shape estimation unit 400 dynamically changes a method of recognizing a road shape such as a lane or a road edge, a processing region, and the like in accordance with an intersection model predicted by the intersection information processing unit 300, an error amount of a sensor used in the sensor unit 100, and the like, and recognizes the intersection shape more stably and with high accuracy.

The consistency determination unit (intersection consistency determination unit 500) determines consistency between the sensor information acquired from the sensor unit 100 and the estimation result acquired from the intersection shape estimation unit 400, and outputs a determination result. Thus, the intersection consistency determination unit 500 acquires a processing result including the intersection shape estimated by the intersection shape estimation unit 400. The intersection consistency determination unit 500 determines consistency between the intersection model used by the intersection shape estimation unit 400 to estimate the intersection shape and the sensor information acquired by the intersection shape estimation unit 400 from the sensor unit 100, and outputs a determination result. At this time, the consistency determination unit (intersection consistency determination unit 500) determines consistency between the sensor information and the estimation result by comparing accuracy information with a predetermined threshold value by using the road model (intersection model) in which the road shape (intersection shape) is estimated and the accuracy information. Here, the accuracy information is information indicating a degree of matching of the sensor information and the road model (intersection model) when the sensor information and the road model (intersection model) are fitted, and is expressed as, for example, reliability. Thus, when the accuracy information is higher than the predetermined threshold value, since the sensor information and the road model (intersection model) sufficiently match, a determination result that the sensor information and the estimation result acquired from the intersection shape estimation unit 400 match is obtained.

However, the intersection information processing unit 300 generates an intersection model in front of the host vehicle while referring to the map information unit 200 based on the host vehicle position. Thus, in a case where the host vehicle position is incorrect, the intersection information processing unit 300 acquires intersection information different from the intersection in front of the host vehicle from the map information unit 200. For example, in a case where the intersection information processing unit 300 regards that there is a cross intersection in front of the host vehicle based on the intersection information acquired from the map information unit 200, an intersection model having a cross shape is generated. However, in a case where a T-shaped intersection having a T shape is actually in front of the host vehicle, a situation in which the intersection shape estimation unit 400 acquires the sensor information output from the sensor unit 100 by observing the T-shaped intersection may occur. Thus, the intersection consistency determination unit 500 determines whether or not there is a contradiction between the generated intersection model and the sensor information of the sensor unit 100. For example, when the intersection information acquired from the map information unit 200 is regarded as being correct, the intersection consistency determination unit 500 can determine that the sensor information of the sensor unit 100 is defective. Such determination processing is referred to as "consistency determination". Note that, since the map information managed by the map information unit 200 is old and the sensor information actually observed by the sensor unit 100 is new, the map information and the sensor information may not be consistent with each other. In this case, it is not possible to generally determine that the sensor information is defective.

Here, a specific example of the consistency determination will be described. The consistency determination unit (intersection consistency determination unit 500) determines consistency between the sensor information and the estimation result by comparing the road model (intersection model) estimated by the road shape estimation unit (intersection shape estimation unit 400) with a connection relationship between a road width and a road structure of the road indicated by the map information. For example, when an intersection model can be acquired as the estimation result from the intersection shape estimation unit 400, the intersection consistency determination unit 500 determines consistency between the intersection model and the sensor information based on information such as the connection relationship between the road width and the road of the acquired intersection model.

In addition, the intersection consistency determination unit 500 may directly acquire the intersection model generated by the intersection information processing unit 300 and may use this intersection model for the consistency determination (a connection form indicated by a broken line in FIG. 1). In addition, the intersection consistency determination unit 500 may perform the consistency determination by comparing the map information acquired from the map information unit 200 with the intersection model of the estimation result obtained by estimating the intersection shape. In addition, the intersection consistency determination unit 500 may perform the consistency determination by using the reliability when the reliability regarding the estimation result obtained by estimating the intersection shape can be acquired from the intersection shape estimation unit 400. The consistency determination unit (the intersection consistency determination unit 500) stores the result of the consistency determination at the intersection where the host vehicle travels in the past.

The display, warning, and control unit 600 acquires the result of the intersection shape estimation unit 400 and displays a recognition result. In addition, the display, warning, and control unit 600 displays driving support information to a driver of the host vehicle, and performs warning for safety support, vehicle control, support of automatic driving, and the like. In addition, the display, warning, and control unit 600 may display a determination result of the intersection consistency determination unit 500 or may give a warning. Thus, the display, warning, and control unit 600 includes a display device for displaying various kinds of information, a speaker for emitting an alarm, and the like.

<Configuration Example of Sensor Unit 100>

Figure 2:
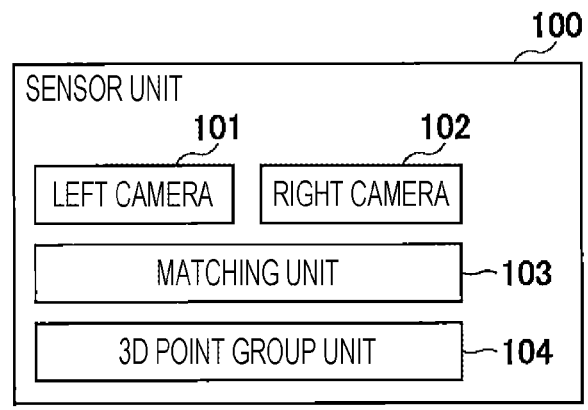
FIG. 2 is a block diagram illustrating a configuration example of a sensor unit according to the embodiment of the present invention.

FIG. 2 is a block diagram illustrating a configuration example of the sensor unit 100.

The sensor unit 100 includes a left camera 101, a right camera 102, a matching unit 103, and a 3D point group unit 104.

As described above, the sensor unit 100 includes an in-vehicle front sensor. In the present embodiment, a stereo camera including the left camera 101 and the right camera 102 will be described as an example of a front sensor. Here, an embodiment of the stereo camera will be described. A sensing method for measuring a distance to an object using the stereo camera is performed by the following procedure.

First, the left camera 101 and the right camera 102 installed at two different positions in front of a vehicle body output a left image and a right image captured within a range of angles of view. Subsequently, in a case where the same object is photographed in the left image and the right image, the matching unit 103 specifies image positions of the same object in the left image and the right image by matching. After the image positions of the same object are specified, in a case where the same object is captured by the left camera 101 and the right camera 102, the matching unit 103 specifies a difference between the positions photographed in the left and right images, and thus, a distance from a position where the stereo camera is mounted to the object is measured.

The 3D point group unit 104 restores a 3D point representing a three-dimensional position of the object by triangulation by specifying a triangle using positions where the left camera 101 and the right camera 102 are installed as vertices of both ends of a bottom side of a triangle and using the positions of the same object on the images as vertices. The 3D point group unit 104 obtains a large number of 3D point groups by repeatedly performing restoration processing of the 3D point on the same object. The 3D point group unit 104 outputs the three-dimensional position of the object represented by the 3D point group to the intersection shape estimation unit 400.

<Configuration Example of Map Information Unit 200>

Figure 3:
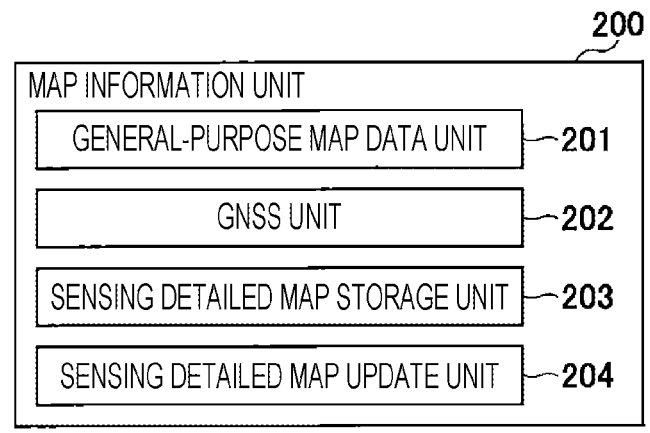
FIG. 3 is a block diagram illustrating a configuration example of a map information unit according to the embodiment of the present invention.

FIG. 3 is a block diagram illustrating a configuration example of the map information unit 200.

As described above, the map information unit 200 retains map information on roads and has a function of specifying the position of the host vehicle on the map. The map information unit 200 according to the present embodiment includes a general-purpose map data unit 201, a Global Navigation Satellite System (GNSS) unit 202, a sensing detailed map storage unit 203, and a sensing detailed map update unit 204.

The general-purpose map data unit 201 uses, as general-purpose map data, a map retained by a car navigation system that expresses a road network by nodes and links. However, the general-purpose map data unit 201 is not necessarily limited to the map retained in the car navigation system. For example, the map may be a map freely published on the Internet, or may be a commercial map accessible via a server. As illustrated in an upper part of FIG. 11 to be described later, the general-purpose map data unit 201 is data including a node indicating a position on the map and a link that connects the nodes to constitute a road network. The general-purpose map data unit 201 expresses the road network based on node and link information.

The GNSS unit 202 specifies the position of the host vehicle in the road network including the node and link information expressed by the general-purpose map data unit 201 by using the GNSS information. Furthermore, the GNSS information may be used for correction of the host vehicle position using another sensor, for example, a camera, a radar, a gyro, or a host vehicle behavior.

The sensing detailed map storage unit 203 stores, as data of a sensing detailed map (referred to as "sensing detailed map data"), information reinforced by sensing of the sensor unit 100, for example, a map enhanced with information that is not included in a general-purpose map, such as a lane width, a road angle, the number of lanes, a distance from an outermost lane to a road shoulder, and a road shape. In addition, the sensing detailed map data updated by the sensing detailed map storage unit 203 is added to the general-purpose map data managed by the general-purpose map data unit 201. The general-purpose map data to which the sensing detailed map data is added is used, and thus, the sensor unit 100 performs sensing by using the detailed sensing map stored at the time of traveling up to a previous time in a case where the host vehicle passes the same road next time. As a result, the sensor unit 100 enables more highly accurate and stable sensing.

The sensing detailed map update unit 204 has a function of updating the stored general-purpose map data with the sensing detailed map data, for example, in a case where the general-purpose map data is old or the road is impassable due to a temporary construction or the like. This update function is performed by using the sensor information output from the sensor unit 100. With this update function, information such as a new road that is not present in the general-purpose map data is added to the general-purpose map data. In addition, regarding a road that is conventionally passable, in a case where the road is not passable, sensing detailed map data updated to be impassable is stored in the sensing detailed map storage unit 203, and then the general-purpose map data is updated.

However, the sensing detailed map update unit 204 does not determine the update of the general-purpose map data when the vehicle travels on the road only once, and merely stores, as the sensing detailed map data, the general-purpose map data in the sensing detailed map storage unit 203. Thus, after the sensor unit 100 senses that the vehicle is inaccessible many times, the sensing detailed map update unit 204 determines that the road is impassable and finally performs the update of the general-purpose map data by using the sensing detailed map data. Such determination of the update processing is the same for a new road that is not stored in the general-purpose map data. That is, the sensing detailed map update unit 204 temporarily registers information on the new road sensed by the sensor unit 100 in the sensing detailed map data at the beginning, but does not register the information as final map data. The sensing detailed map update unit 204 confirms that the new road is a reliable road from the fact that the vehicle passes through the road several times, and then additionally registers, as the final map data, the sensing detailed map data including the new road in the general-purpose map data.

<Configuration Example of Intersection Information Processing Unit 300>

Figure 4:
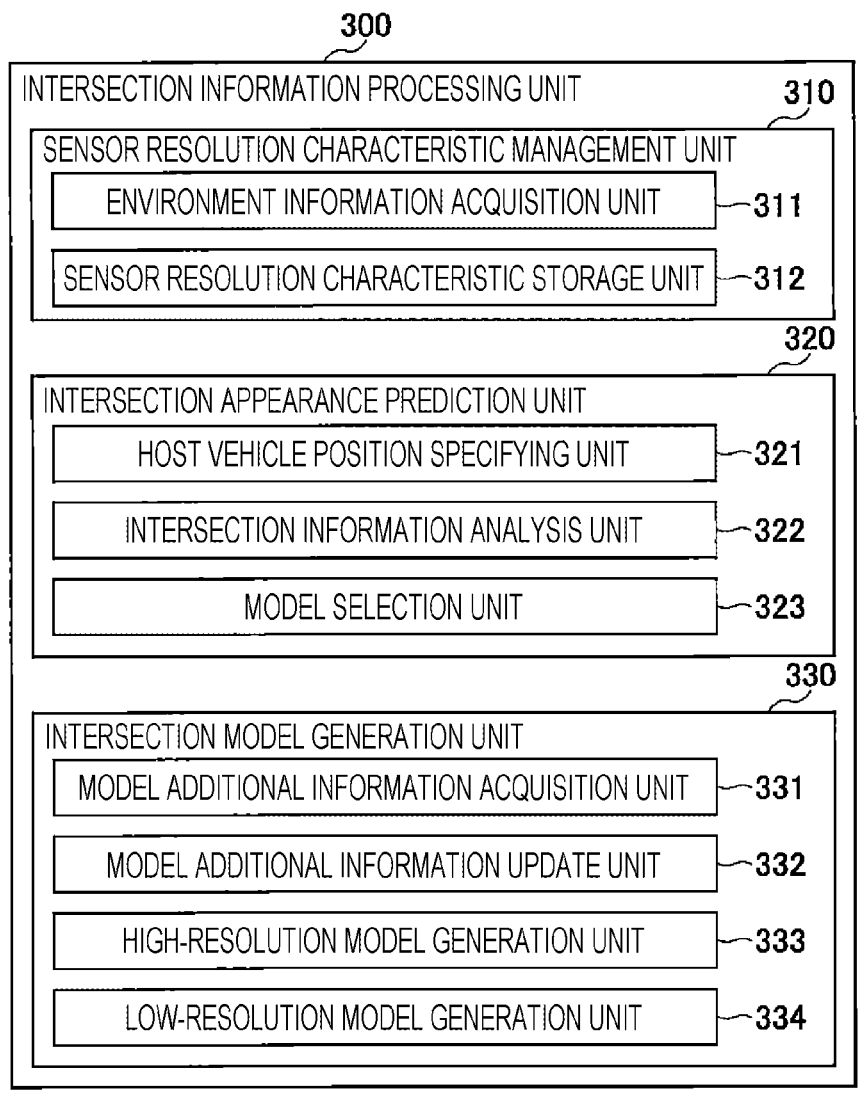
FIG. 4 is a block diagram illustrating a configuration example of an intersection information processing unit according to the embodiment of the present invention.

FIG. 4 is a block diagram illustrating a configuration example of the intersection information processing unit 300. The intersection information processing unit 300 predicts how the intersection looks from the sensor based on the intersection information of the intersection present in front of the host vehicle acquired from the map information unit 200 and a sensor resolution characteristic corresponding to the sensor acquired from a sensor resolution characteristic storage unit 312, and generates an intersection model corresponding to the predicted appearance. The intersection information processing unit 300 includes a sensor resolution characteristic management unit 310, an intersection appearance prediction unit 320, and an intersection model generation unit 330.

(Configuration Example of Sensor Resolution Characteristic Management Unit 310)

First, a configuration example of the sensor resolution characteristic management unit 310 will be described.

The sensor resolution characteristic management unit (sensor resolution characteristic management unit 310) manages a sensor resolution characteristic of the sensor unit (sensor unit 100) corresponding to a distance from the host vehicle position of the host vehicle to a position where the road shape changes. For example, the sensor resolution characteristic management unit 310 acquires a distance from the host vehicle position to the intersection and environment information that influences the sensor resolution characteristic of the sensor, and outputs the sensor resolution characteristic corresponding to the acquired environment information to the intersection appearance prediction unit 320. The sensor resolution characteristic management unit 310 includes an environment information acquisition unit 311 and the sensor resolution characteristic storage unit 312.

The sensor resolution characteristic management unit (sensor resolution characteristic management unit 310) includes an environment information acquisition unit (environment information acquisition unit 311) that acquires environment information that influences a limit distance. The environment information acquisition unit 311 has a function of acquiring a sensor resolution characteristic and environment information that influences an observation limit of the sensor. For example, in the case of a sensor that observes a luminance value, such as a stereo camera or a monocular camera, visibility of an intersection changes due to a change in illuminance of an environment. As described above, since a difficulty level at which the sensor observes the object varies depending on an environmental situation, a time related to the change in illuminance of the environment is acquired as the environment information.

In addition, since weather is also considered as a factor that influences the change in illuminance of the environment, the environment information acquisition unit 311 may acquire weather information as the environment information. In addition, in a case where a headlight of the host vehicle is turned on, since there is a possibility that an observation range of the sensor is widened even in a low-illuminance environment such as nighttime or bad weather, the environment information acquisition unit 311 may acquire an operation status of the headlight as the environment information. Similarly, even in a case where a street lamp around an intersection is turned on, since the observation range of the sensor is influenced, the environment information acquisition unit 311 may acquire an operation status of the street lamp as the environment information. In addition, in a case where there is an obstacle such as another vehicle or a pedestrian around the host vehicle, an intersection behind the obstacle cannot be observed by the sensor, and the intersection information processing unit 300 cannot acquire intersection information. Thus, the environment information acquisition unit 311 may acquire information on the obstacle around the host vehicle.

The sensor resolution characteristic management unit (sensor resolution characteristic management unit 310) includes the sensor resolution characteristic storage unit (sensor resolution characteristic storage unit 312) that stores, as the sensor resolution characteristic, a limit distance at which the sensor unit (sensor unit 100) can observe a specific shape of a road. For example, the sensor resolution characteristic storage unit 312 stores, as the sensor resolution characteristic, a distance at which a road width on a side of the intersection can be observed, a distance at which a curve of the lane on which the host vehicle travels can be observed, and the like. The sensor resolution characteristic management unit (sensor resolution characteristic management unit 310) reads the sensor resolution characteristic corresponding to the environment information from the sensor resolution characteristic storage unit (sensor resolution characteristic storage unit 312), and outputs the sensor resolution characteristic to the appearance prediction unit (intersection appearance prediction unit 320). Here, an example of the sensor information of the cross intersection observed by the sensor unit 100 will be described with reference to FIG. 10.

<Example of Sensor Information at Cross Intersection>

Figure 10:
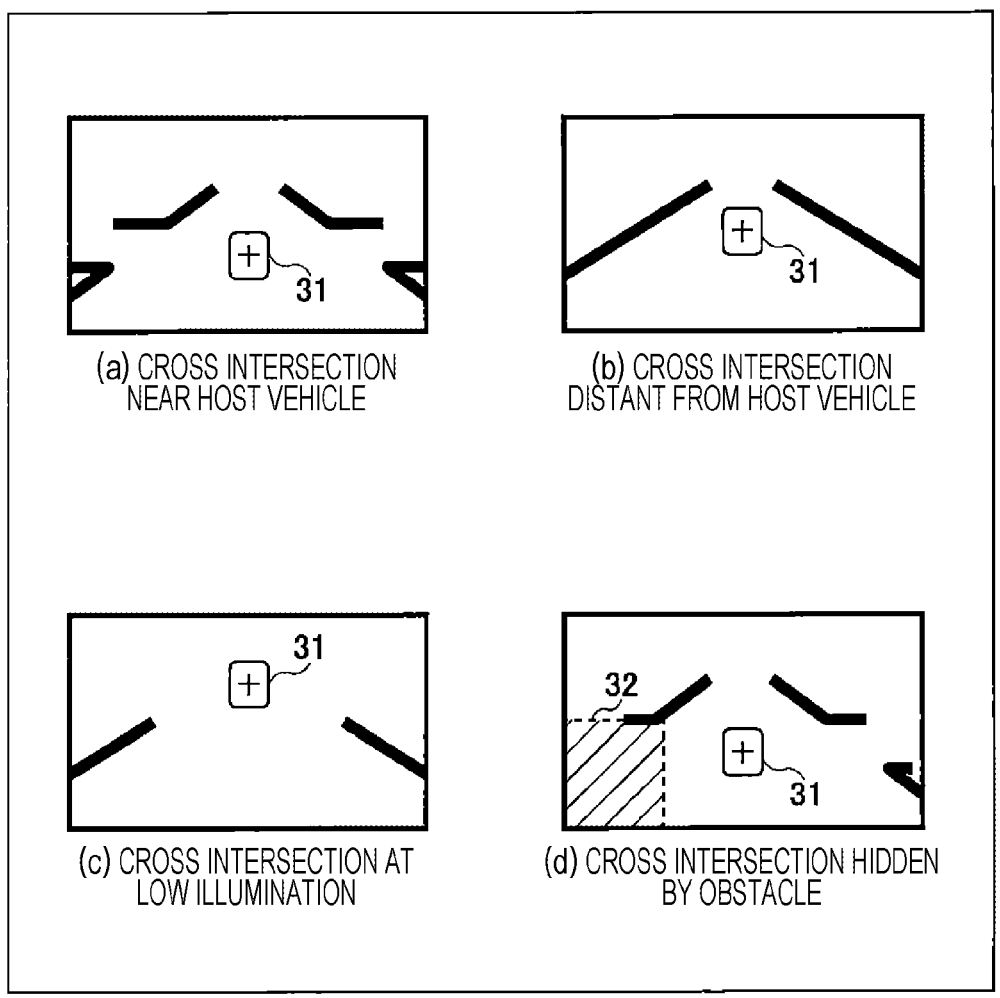
FIG. 10 is a diagram illustrating an example of sensor information of a cross intersection according to the embodiment of the present invention.

FIG. 10 is a diagram illustrating an example of the sensor information of the cross intersection. A mark 31 near a center of each drawing represents a center position of the cross intersection (a position where two roads intersect) sensed by the sensor.

(a) Cross Intersection Near Host Vehicle

When the host vehicle approaches the intersection, the sensor can observe a road width of a road branching at the cross intersection as illustrated in an explanatory diagram (a) of FIG. 10.

(b) Cross Intersection Distant from Host Vehicle

In a case where the intersection is distant from the host vehicle, the sensor cannot accurately observe the road width of the road branching to the left and right as illustrated in an explanatory diagram (b) of FIG. 10. Thus, the intersection information processing unit 300 cannot accurately grasp the road width of the road branching to the left and right based on the sensor information.

Thus, the sensor resolution characteristic storage unit 312 stores, as the sensor resolution characteristic, the limit distance (hereinafter, referred to as a "first distance") at which the sensor unit 100 can observe the road width on the side of the intersection branching to the left and right. In a case where the sensor resolution characteristic storage unit 312 can acquire road width information of the road from the map information unit 200, the sensor resolution characteristic storage unit 312 can calculate the first distance by combining a sensor type of the sensor used to recognize the shapes of the intersection and the road and the road width information acquired from the map information unit 200.

In addition, in a case where the map information unit 200 does not include the road width information but instead includes information on a type and a grade of the road defined in the Road Structure Ordinance, the first distance may be calculated by using, as the road width information, prescribed values of the lane width and the distance to the road shoulder indicated in the Road Structure Ordinance based on the information on the type and grade. In addition, in a case where the road width information acquired when the vehicle previously travels is stored, the sensor resolution characteristic storage unit 312 may calculate the first distance by using the road width information.

(c) Cross Intersection at Low Illumination

In addition, the sensor resolution characteristic storage unit 312 may store the observation limit distance of the sensor as the sensor resolution characteristic. In the case of a sensor that observes a luminance value, such as a stereo camera or a monocular camera, the observation range of the sensor is narrowed in a low-illumination environment. For example, in a case where the observation range of the sensor is narrowed at nighttime or under bad weather, the sensor information indicating that the sensor can observe only near the host vehicle is obtained as illustrated in an explanatory diagram (c) of FIG. 10. Thus, it is not possible to observe a scene of the intersection distant from the host vehicle.

As described above, since the observation limit distance (hereinafter, referred to as a "second distance") corresponding to the change in illuminance of the environment greatly influences how the intersection looks, a relationship between the change in illuminance and the second distance may be stored in the sensor resolution characteristic storage unit 312. On the other hand, even in the low-illuminance environment, the second distance becomes long in a situation where the headlight is in operation or the street lamp near the intersection is turned on. Thus, the sensor resolution characteristic storage unit 312 may store the second distance in consideration of the operation status of the street lamp and the lighting status of the street lamp, or may store information indicating these statuses together with the second distance.

(d) Cross Intersection Partially Hidden by Obstacle

In addition, the sensor resolution characteristic storage unit 312 may store a position and a size of the obstacle acquired by the environment information acquisition unit 311. For example, it is assumed that there is an automobile parked on the road in front the intersection as the obstacle. In this case, as illustrated in an explanatory diagram (d) of FIG. 10, the intersection partially shielded by the obstacle is observed by the sensor. A shielding range 32 (region indicated by shadow in the drawing) in which the obstacle shields the intersection or the road is determined by the position and the size of the obstacle. Thus, the sensor resolution characteristic storage unit 312 may store the shielding range 32 or information indicating the position and the size of the obstacle.

(Configuration Example of Intersection Appearance Prediction Unit 320)

Next, a configuration example of the intersection appearance prediction unit 320 will be described with reference to FIG. 4.

The appearance prediction unit (intersection appearance prediction unit 320) predicts an appearance of the road corresponding to the distance based on the sensor resolution characteristic acquired from the sensor resolution characteristic management unit (sensor resolution characteristic management unit 310). For example, the intersection appearance prediction unit 320 predicts an appearance of the intersection observed by the sensor based on the sensor resolution characteristic input from the sensor resolution characteristic management unit 310. The intersection appearance prediction unit 320 includes a host vehicle position specification unit 321, an intersection information analysis unit 322, and a model selection unit 323.

(Configuration Example of Host Vehicle Position Specification Unit 321)

Next, in order to describe an operation of the host vehicle position specification unit 321, a configuration example of the host vehicle position specification unit 321 will be described with reference to FIG. 5.

Figure 5:
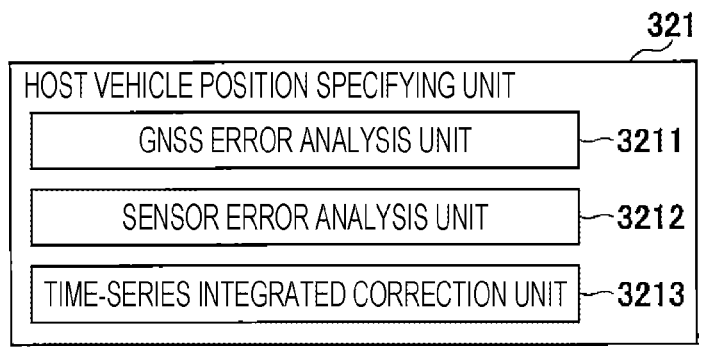
FIG. 5 is a block diagram illustrating a configuration example of a host vehicle position specification unit according to the embodiment of the present invention.

FIG. 5 is a block diagram illustrating a configuration example of the host vehicle position specification unit 321.

The host vehicle position specification unit (host vehicle position specification unit 321) specifies the host vehicle position on the map included in the map information. The host vehicle position specification unit 321 includes a GNSS error analysis unit 3211, a sensor error analysis unit 3212, and a time-series integrated correction unit 3213.

The GNSS error analysis unit 3211 performs error analysis of the host vehicle position using the behavior of the host vehicle and GNSS information acquired by a navigation system (not illustrated). Here, the GNSS error analysis unit 3211 analyzes an error (GNSS error) while checking which part on the map the host vehicle is traveling on with the map information. Error information as an analysis result is used for more accurate correction of the host vehicle position. Thus, the GNSS error analysis unit 3211 outputs the analyzed error information to the time-series integrated correction unit 3213.

The sensor error analysis unit 3212 analyzes errors (sensor errors) in a vertical position and a horizontal position of the host vehicle position on the map by using information obtained from a sensor such as an inertial sensor (gyro), a camera, a millimeter wave, or a Lidar. The sensor error analysis unit 3212 outputs error information to the time-series integrated correction unit 3213.

The time-series integrated correction unit 3213 performs correction of the host vehicle position on the map by using the error information acquired from the GNSS error analysis unit 3211 and the sensor error analysis unit 3212. However, when the time-series integrated correction unit 3213 performs the correction of the host vehicle position based on the GNSS error or the sensor error from an instantaneous determination result, the host vehicle position is likely to be updated with uncertain information, or unstable position update is likely to occur. Thus, the time-series integrated correction unit 3213 performs stable error correction by analyzing errors in time series and integrating the analysis results.

(Configuration Example of Intersection Information Analysis Unit 322)

Next, in order to describe an operation of the intersection information analysis unit 322, a configuration example of the intersection information analysis unit 322 will be described with reference to FIG. 6.

Figure 6:
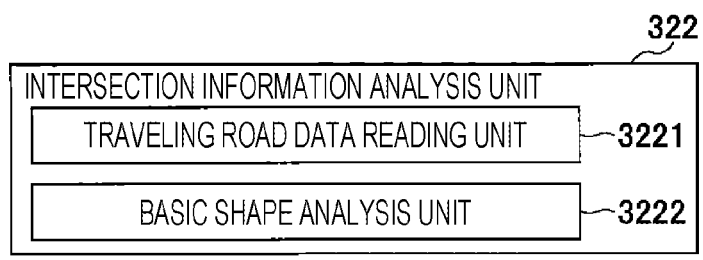
FIG. 6 is a block diagram illustrating a configuration example of an intersection information analysis unit according to the embodiment of the present invention.

FIG. 6 is a block diagram illustrating a configuration example of the intersection information analysis unit 322.

The road information analysis unit (intersection information analysis unit 322) acquires road shape information (intersection information) representing a road shape (shape of the intersection) present in front of the host vehicle in the traveling direction based on the specified host vehicle position and the map information, and analyzes the road shape information (intersection information). For example, the intersection information analysis unit 322 analyzes the intersection information acquired from the map information unit 200. The intersection information analysis unit 322 includes a traveling road data reading unit 3221 and a basic shape analysis unit 3222. The intersection information analysis unit 322 first causes a traveling road data reading unit 3221 to read map information corresponding to a traveling road of the host vehicle and read data including the node and link information illustrated in the upper part of FIG. 11 to be described later.

(Basic Structure of Intersection)

Here, a basic structure of the intersection will be described with reference to FIG. 11.

Figure 11:
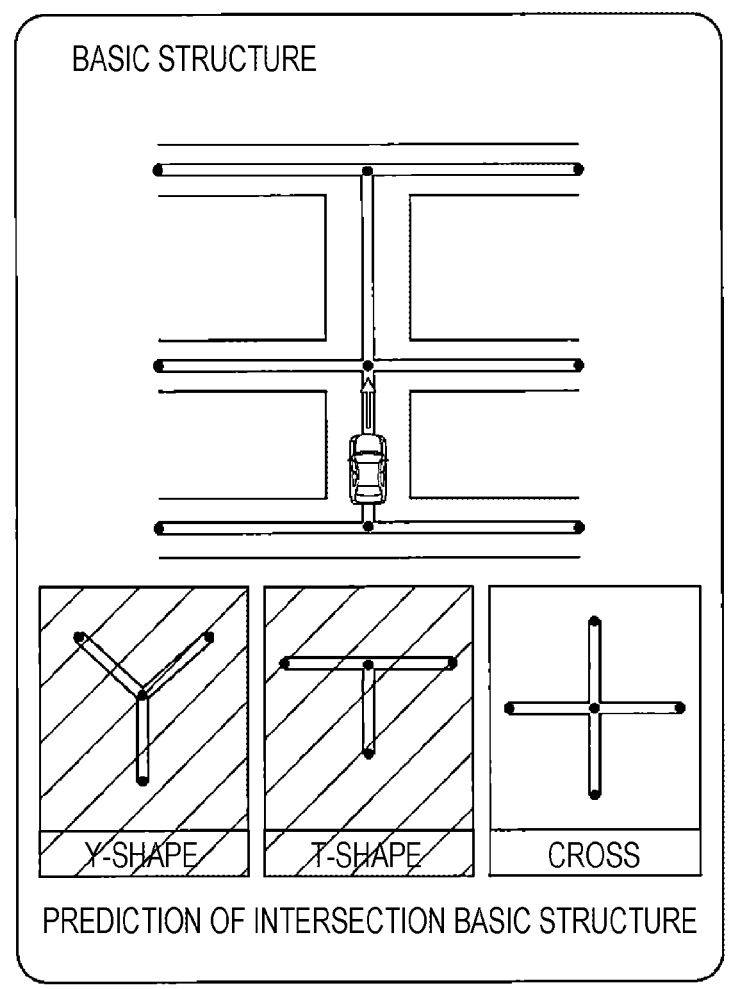
FIG. 11 is a diagram illustrating an example of a basic structure of an intersection according to the embodiment of the present invention.

FIG. 11 is a diagram illustrating an example of the basic structure of the intersection. The upper part of FIG. 11 illustrates an example of the map and the host vehicle position, and a lower part of FIG. 11 illustrates an example of the shape of the intersection predicted from basic structures of intersections of a Y-shape, a T-shape, and a cross-shape.

The upper part of FIG. 11 illustrates a roughly divided map region where the host vehicle is present. In this map region, for example, the map region is divided into a 5 km square. The traveling road data reading unit 3221 reads, for example, data of node and link information present in a 5 km square where the host vehicle is present from the map information unit 200. Data of the node and link information indicated in the basic structure is used to recognize a road (referred to as a "traveling road") present in the traveling direction of the host vehicle from the map.

The basic shape analysis unit 3222 illustrated in FIG. 6 acquires, from the traveling road data reading unit 3221, the basic structure including the node and link information at the intersection around the host vehicle read by the traveling road data reading unit 3221. Furthermore, the basic shape analysis unit 3222 predicts an intersection shape of the intersection present in front of the host vehicle in accordance with an analysis result of the host vehicle position and the host vehicle traveling road.

For example, in a case where a scene in which the host vehicle travels upward is shown on the map illustrated in the upper part of FIG. 11, the basic shape analysis unit 3222 predicts that the intersection in front of the host vehicle is a cross, a distance to the cross from the host vehicle position, and the like. The lower part of FIG. 11 illustrates that the basic structure of the intersection in front of the host vehicle is a cross and the basic shape analysis unit 3222 selects the intersection among intersections represented by a plurality of basic structures. Here, since the intersection represented by the basic structure other than the cross is not selected, the basic structure of the intersection of the Y-shape and the T-shape other than the cross is grayed out.

(Operation Example of Model Selection Unit 323)

Next, an operation of the model selection unit 323 will be described with reference to FIG. 4.

The model selection unit (model selection unit 323) selects a model that can be generated by the model generation unit (intersection model generation unit 330) based on the sensor resolution characteristic acquired from the sensor resolution characteristic management unit (sensor resolution characteristic management unit 310) based on the road shape information and the sensor information. For example, the model selection unit 323 selects one of a high-resolution model and a low-resolution model to be used based on the intersection information of the intersection present in front of the host vehicle acquired from the map information unit 200 and the sensor resolution characteristic acquired from the sensor resolution characteristic storage unit 312, and outputs a selection result to the intersection model generation unit 330. Here, the high-resolution model is a model used in a case where it is estimated that the road width on the side can be detected by using the sensor information of the sensor unit 100, and is referred to as a "first model" in the following description. On the other hand, the low-resolution model is a model used in a case where it is estimated that the road width on the side cannot be detected by using the sensor information of the sensor unit 100, and is referred to as a "second model" in the following description.

(Example in which One Model is Selected and Used)

First, the model selection unit 323 acquires an intersection type in front of the host vehicle from the intersection information analysis unit 322. Subsequently, the model selection unit 323 acquires the first distance managed by the sensor resolution characteristic management unit 310 based on the acquired intersection type. Thereafter, the model selection unit 323 compares the first distance with the distance from the host vehicle position to the intersection acquired from the intersection information analysis unit 322. The model selection unit 323 selects the first model in a case where it is determined that the distance from the host vehicle position to the intersection is shorter than the first distance and the sensor can observe the road width on the side of the intersection. On the other hand, the model selection unit 323 selects the second model in a case where it is determined that the distance from the host vehicle position to the intersection is larger than the first distance and the sensor cannot observe the road width on the side of the intersection. Finally, the model selection unit 323 outputs the selection result to the intersection model generation unit 330.

(Example in which Plurality of Models are Switched and Used)

Note that, the model selection unit 323 does not switch only one of the first model and the second model by comparing the distance from the host vehicle position to the intersection with the first distance, but may switch and use three or a plurality of models.

FIG. 12 is a diagram illustrating an example in which the model selection unit 323 switches and uses the plurality of models. Here, a variable model capable of handling the plurality of models as one model is referred to as a "third model". When the model selection unit 323 selects the third model, the intersection model generation unit 330 generates a plurality of switchable models as follows.

For example, in a case where the intersection is distant than the first distance, the sensor cannot observe the road width on the side of the intersection. Thus, the intersection model generation unit 330 generates, as the model illustrated in an explanatory diagram (a) of FIG. 12, a cross intersection distant from the host vehicle position than the first distance.

On the other hand, in a case where the intersection is near than the first distance, as the host vehicle approaches the intersection, the size of the road width on the side of the intersection observed by the sensor also increases. Immediately after the distance from the host vehicle position to the intersection falls below the first distance, the sensor can slightly observe the road width on the side of the intersection. Thus, the intersection model generation unit 330 generates, as a model illustrated in an explanatory diagram (b) of FIG. 12, a cross intersection at a position equal to or less than the first distance from the host vehicle position.

Further, when the host vehicle approaches the intersection, the road width on the side of the intersection increases. A scene when the host vehicle approaches near the cross intersection is illustrated on a left side of an explanatory diagram (c) of FIG. 12. A thick solid line in the drawing represents a road boundary of a side road forming intersection. With the host vehicle position in the drawing as a main part of a fan shape, a range that can be observed by the sensor without being blocked by an obstacle or the like in a visual field range of the sensor represented by a fan shape of a dashed dotted line is represented by a broken line. The intersection model generation unit 330 generates, as a model illustrated on a right side of the explanatory diagram (c) of FIG. 12, a cross intersection near the host vehicle. This model shows that the boundaries of the roads constituting the cross intersection are clear.

The model selection unit 323 outputs, to the intersection model generation unit 330, a selection result indicating that the third model is selected and the size of the road width on the side of the intersection observed by the sensor. The intersection model generation unit 330 generates an intersection model that continuously changes in the order of the explanatory diagrams (a), (b), and (c) in FIG. 12. When the third model is selected by the model selection unit 323 in this manner, as the host vehicle approaches the intersection, the intersection model generated by the intersection model generation unit 330 changes continuously.

Note that, in a case where the second distance can be acquired from the sensor resolution characteristic management unit 310, the model selection unit 323 may output the acquired second distance to the intersection model generation unit 330 together with the selection result as to whether or not to use the first model or the second model. The intersection model generation unit 330 can generate the first model or the second model based on the second distance. In addition, in a case where obstacle information around the host vehicle can be acquired from the sensor resolution characteristic management unit 310, the model selection unit 323 may output the obstacle information to the intersection model generation unit 330. By using the obstacle information, the intersection model generation unit 330 grasps that the sensor cannot accurately observe the front of the host vehicle at a present point in time since there is the obstacle in the observation range of the sensor.

(Configuration Example of Intersection Model Generation Unit 330)

Next, referring back to FIG. 4, a configuration example and an operation example of the intersection model generation unit 330 will be described.

The model generation unit (intersection model generation unit 330) generates the road model (intersection model) obtained by modeling the road based on the appearance of the road predicted by the appearance prediction unit (intersection appearance prediction unit 320). For example, the intersection model generation unit 330 acquires the intersection information acquired from the intersection information analysis unit 322 and the information on the model selected by the model selection unit 323, and generates the intersection model corresponding to the sensor resolution characteristic acquired from the sensor resolution characteristic management unit 310. The intersection model generation unit 330 includes a model additional information acquisition unit 331, a model additional information update unit 332, a high-resolution model generation unit 333, and a low-resolution model generation unit 334.

Here, the intersection model generated by the intersection model generation unit 330 will be described with reference to FIG. 13.

Figure 13:
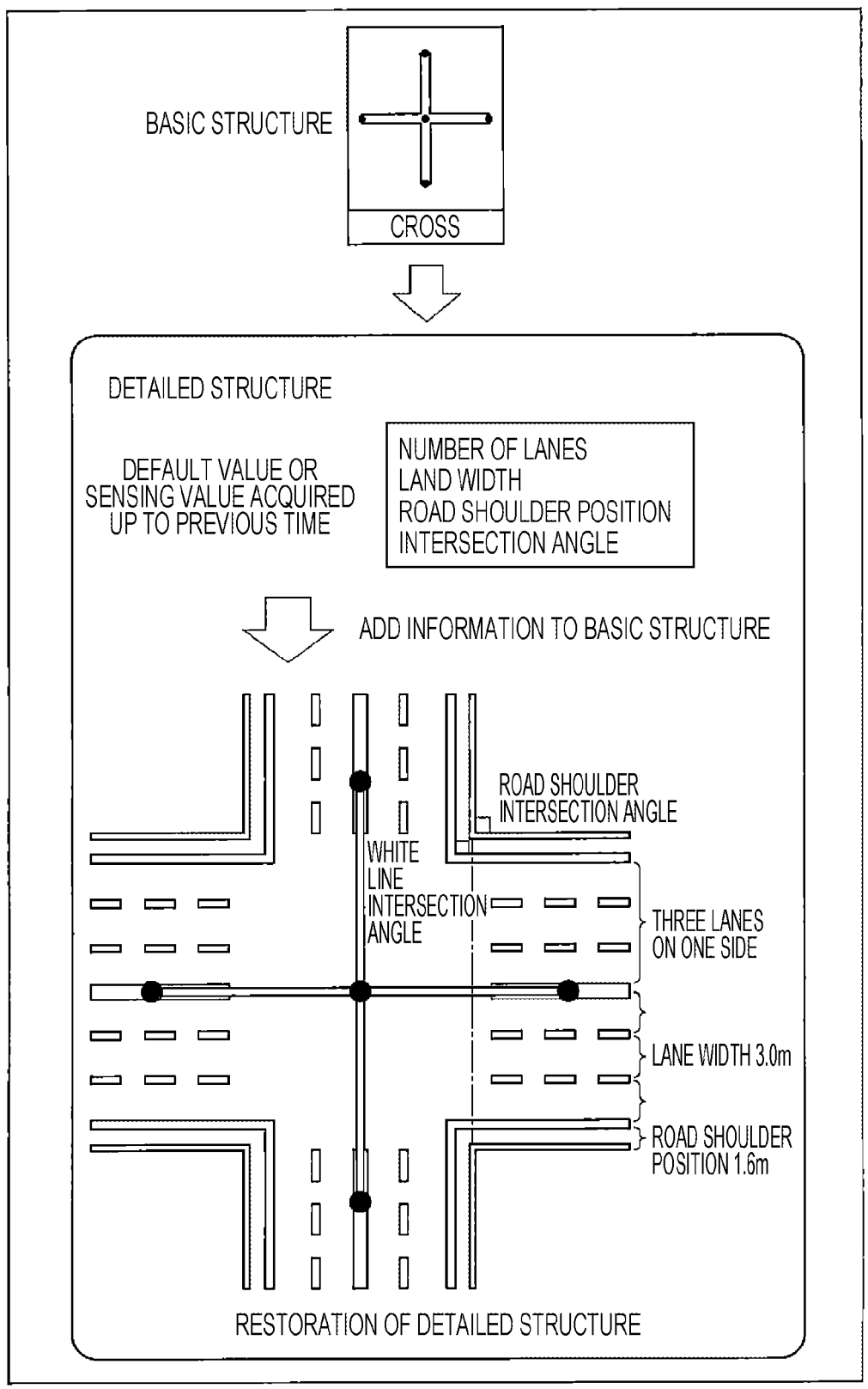
FIG. 13 is a diagram illustrating an example of a basic structure of an intersection model according to the embodiment of the present invention and a detailed structure of a restored intersection model.

FIG. 13 is a diagram illustrating an example of the basic structure of the intersection model and a detailed structure of a restored intersection model.

A cross intersection is illustrated as an example of the basic structure of the intersection on an upper side of FIG. 13. It is assumed that the basic structure of the cross intersection is predicted by analysis processing of the basic shape analysis unit 3222 illustrated in FIG. 11, for example.

The intersection model generation unit 330 illustrated in FIG. 4 acquires the basic structure of the intersection illustrated on the upper side of FIG. 13 from the intersection information analysis unit 322. The model additional information acquisition unit 331 restores the detailed structure of the intersection illustrated on a lower side of FIG. 13 by acquiring additional information (road width, angle, or the like) and adding the additional information to the basic structure represented by the node and link information.

The lower side of FIG. 13 illustrates a scene in which the detailed structure of the intersection model is restored by adding a default value or a sensing value acquired up to a previous time to the basic structure of the intersection. Examples of the default value or the sensing value acquired up to the previous time include the number of lanes, a lane width, a road shoulder position, and an intersection angle. As illustrated in the lower side of FIG. 13, for example, an intersection model in which a road shoulder position is 1.6 m, a lane width is 3.0 m, three lanes are present on one side, and a road shoulder intersection angle and a white line intersection angle are 90 degrees is generated.

In a case where additional information such as the number of lanes, a lane width, and angle information between roads and white lines is stored in the map information unit 200, the model additional information acquisition unit 331 acquires the additional information from the map information unit 200. However, depending on the map information used by the map information unit 200, it may not be possible to acquire detailed additional information such as the number of lanes, the lane width, the angle between the roads, and the distance from the lane to the road shoulder. In a case where the model additional information acquisition unit 331 cannot partially acquire these pieces of information, the intersection model generation unit 330 uses default information. This default information may also be fixed information such as two lanes, a lane width of 3 m, and a road shoulder of 1.5 m, which is constantly constant, but model additional information may be generated by setting a default value based on information such as a type and a grade of the road in the map information unit 200.

Example of Default Value

Next, default information including default values used by the intersection model generation unit 330 will be described with reference to FIGS. 14 to 16.

As described above, in a case where there is no model additional information in the map information unit 200, the intersection model generation unit 330 sets a default value corresponding to a situation of the road by using indirect information. The intersection model generation unit 330 can restore the detailed road shape with higher accuracy by switching and using the default value set in accordance with the situation of the road rather than using the fixed default value, and can use the detailed road shape for the observation of the sensor.

FIG. 14 illustrates tables showing an example of information on the type of the road and the grade of the road defined in the Road Structure Ordinance.

FIG. 14A is a table in which kinds of roads and types of roads of type 1 to type 4 defined for each area are described.

FIG. 14B is a table in which the grade of the road defined by a planned traffic volume per day (vehicles/day) with respect to the kind of the road and the terrain of the area is described.

It is assumed that the information on the type and the grade of the road illustrated in FIGS. 14A and 14B is stored in the map information unit 200. In this case, the intersection model generation unit 330 may restore the intersection model having the detailed road shape with high accuracy by using, as a default value, a prescribed value defined in the Road Structure Ordinance based on the information of the type and the grade of the road acquired from the map information unit 200.

FIG. 15 is a table illustrating examples of classification of the types of the roads defined in the Road Structure Ordinance and lane widths of normal roads.

In the classification of the types of the roads, the grade of the road (one or more of first grade to fourth grade) is defined for the type of the road (first grade to fourth grade). The lane width of the normal road is defined as a prescribed value for each classification of the type of the road. Thus, it is assumed that the classification of the type of the road illustrated in FIG. 15 and information on the lane width of the normal road are stored in the map information unit 200. In this case, the intersection model generation unit 330 may restore the intersection model having the detailed road shape with high accuracy by using a prescribed value defined in the Road Structure Ordinance as a default value based on the classification of the road acquired from the map information unit 200 and the lane width of the normal road.

FIG. 16 is a table illustrating an example of the classification of the type of the road defined in the Road Structure Ordinance and the width of the road shoulder of the normal road.

In the classification of the type of the road, the grade of the road (one or more of first grade to fifth grade) is defined for the type of the road (first grade to fourth grade). A width of a road shoulder provided on a left side of the normal road and a width of a road shoulder provided on a right side of the normal road are defined as prescribed values for each classification of the type of the road. Thus, it is assumed that the classification of the type of the road illustrated in FIG. 16 and the information on the widths of the road shoulders on the left and right sides of the normal road are stored in the map information unit 200. In this case, the intersection model generation unit 330 may restore the intersection model having the detailed road shape with high accuracy by using the prescribed value as the default value based on the classification of the type of the road acquired from the map information unit 200 and the widths of the road shoulders of the normal road.

Incidentally, the map information unit 200 may not include information such as the type and the grade of the road illustrated in FIGS. 14 to 16. Thus, the intersection model generation unit 330 may not be able to refer to the default value defined in accordance with the information such as the type and the grade of the road from the map information unit 200. Thus, the intersection model generation unit 330 may restore the intersection model having the detailed road shape by switching and using the default value in accordance with the road based on another information retained in the map information unit 200. This example will be described with reference to FIGS. 17 and 18.

FIG. 17 illustrates tables showing an example of road information corresponding to the kind and the type of the road or the grade of the road. Each table illustrated in FIG. 17 is represented as an alternative example used in a case where the map information unit 200 does not include information such as the direct lane width, the number of lanes, and the road shoulder for the intersection model generation unit 330 to generate the intersection model and there is no type or grade information of the road.

FIG. 17A is a table storing information on the number of lanes on one side, a lane width, and a roadside zone corresponding to the kind and the type of the road. In the table of FIG. 17A, there is only kind and type information of the road, and there is no grade information. Detailed standards of the Road Structure Ordinance cannot be expressed only by the table of FIG. 17A with one-dimensional type information. However, the information stored in the table of FIG. 17A is useful for predicting a rough width and the number of lanes of the road. Thus, as compared with a case where there is no information at all, the intersection model generation unit 330 can accurately predict the road information and can restore the intersection model.

FIG. 17B is a table storing information on the number of lanes on one side, a lane width, a designed speed, and a roadside zone corresponding to the grade of the road. In the table of FIG. 17B, there is only grade information of the road and there is no type information. The detailed standards of the Road Structure Ordinance cannot be expressed only by the table of FIG. 17B with one-dimensional type information. However, the information stored in the table of FIG. 17B is useful for predicting the rough width and the number of lanes of the road. Thus, as compared with a case where there is no information at all, the intersection model generation unit 330 can accurately predict the road information and can restore the intersection model.

FIG. 18 illustrates tables showing an example of road information corresponding to a kind of the road or a speed limit. Each table illustrated in FIG. 18 is represented as an alternative example used in a case where the map information unit 200 does not include information such as the direct lane width, the number of lanes, and the road shoulder for the intersection model generation unit 330 to generate the intersection model and there is no type and grade information of the road.

FIG. 18A is a table storing information on the number of lanes on one side, a lane width, a designed speed, and a roadside zone corresponding to the kind of the road. In the table of FIG. 18A, there is no type and grade information of the road, but the kinds of the roads are roughly stored. That is, in the table of FIG. 18A, default values corresponding to the kinds of the roads are set. According to the table of FIG. 18A, information for the intersection model generation unit 330 to generate the intersection model is appropriately set with a default value (fixed value) in accordance with the kind of the road on which the vehicle is traveling. In addition, a default value for each detailed road shape is set in a table (not illustrated) that can be referred to by the intersection model generation unit 330. Note that, in a case where the information such as the number of lanes is partially stored in the general-purpose map, the intersection model generation unit 330 achieves high accuracy of the intersection model by preferentially using the information stored in the general-purpose map and using only insufficient information with a default value corresponding to the situation.

FIG. 18B is a table storing information on the number of lanes on one side, a lane width, a designed speed, and a roadside zone corresponding to the speed limit. In the table of FIG. 18B, there is no information on the type and the grade of the road, but a default value corresponding to the speed limit is set. According to the table of FIG. 18B, information for the intersection model generation unit 330 to generate the intersection model is appropriately set with a default value in accordance with the speed limit of the road on which the vehicle is traveling. A default value for each detailed road shape is set in the table.

In addition, the map information unit 200 may not store the information regarding the type of the road but may store information on the speed limit, or may obtain the information regarding the speed limit by the sensor information or communication. In these cases, a method for dynamically switching the default value in accordance with the speed limit based on the table illustrated in the table of FIG. 18B by the intersection model generation unit 330 may be adopted. In addition, a method for indirectly and dynamically setting the number of lanes, the lane width, a distance of the roadside zone, and the like in accordance with the situation of the road on which the host vehicle travels by the intersection model generation unit 330 may be used.

Note that, even though the intersection model generation unit 330 cannot obtain the information based on each table illustrated in FIGS. 14 to 18, a vehicle speed limit of the road may be obtained by one of the information received by the map information unit 200 through communication, the map information included in the map information unit 200, and the sensor information by the sensor unit 100. In this case, the intersection model generation unit 330 may generate the intersection model by using the table that can refer to the default value of the road corresponding to the obtained vehicle speed limit. Furthermore, in a case where none of the information received by communication, the map information, and the sensor information is obtained, the intersection model generation unit 330 may set a fully fixed default value and generate the intersection model.

(Configuration Example of Model Additional Information Update Unit 332)

Next, a configuration example and an operation example of the model additional information update unit 332 illustrated in FIG. 4 will be described with reference to FIG. 7.

Figure 7:
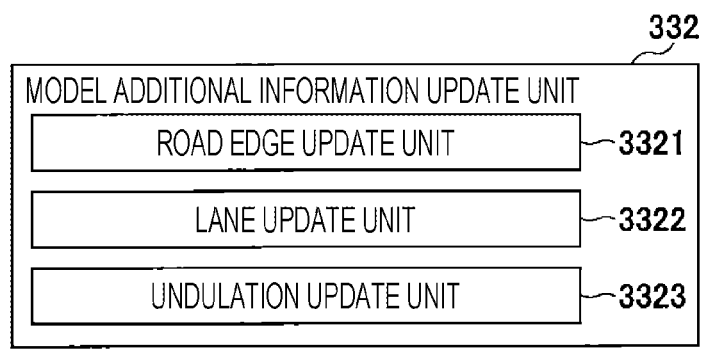
FIG. 7 is a block diagram illustrating a configuration example of a model additional information update unit according to the embodiment of the present invention.

FIG. 7 is a block diagram illustrating a configuration example of the model additional information update unit 332.

When the vehicle travels in the same place, the model additional information update unit 332 determines whether or not the sensor information acquired up to the previous time may be used based on reliability of the sensor information. In this determination, sensor information obtained by observation by the sensor unit 100, such as road edges, lanes, and undulations of the road on which the host vehicle travels in the past, is used. Here, in a case where the reliability of the sensor information is lower than a certain threshold value, the model additional information update unit 332 uses the sensor information as a provisional value only for this time, and does not transmit the sensor information for data storage and update to the map information unit 200. On the other hand, in a case where the sensor information is equal to or greater than the threshold value and has sufficient reliability, the model additional information update unit 332 transmits the sensor information to the map information unit 200. The map information unit 200 stores and updates the received sensor information.

However, in a case where the sensor information is received only once, the map information unit 200 does not store and update the data in the map information unit 200 using the sensor information. Thus, in a case where the highly reliable sensor information is received several times, the map information unit 200 stores and updates data using the highly reliable sensor information. Alternatively, in a case where the reliability of the sensor information obtained by observation by the sensor unit 100 this time is extremely high and a degree of matching with the already stored data is high, the map information unit 200 may update the map data by fusing the stored data and the sensor information for this time.

The model additional information update unit 332 includes a road edge update unit 3321, a lane update unit 3322, and an undulation update unit 3323. All the road edge, the lane, and the undulation are used as useful model additional information when added by the intersection model generation unit 330 to generate a highly accurate intersection model.

The road edge update unit 3321 updates information on a positional relationship between an outermost lane and the road edge. In addition, the road edge update unit 3321 also performs update or the like on information on deformation of the shapes of the lane and the road edge.

As for information that is not retained by the map information unit 200, such as a complicated change in a lane shape at an intersection or a junction and a confluence, information on a lane width, and an angle between roads, the lane update unit 3322 performs determination of whether or not the sensor information corresponding to the reliability is used based on the number of lanes of the road.

The undulation update unit 3323 handles information on unevenness and inclination of the road. For example, in a case where there is certain reliability for shapes and positions of small bumps, large bumps, and the like having a convex shape for speed control set on a road for entering a residential area, the undulation update unit 3323 determines whether or not to deliver the information on the undulation of the road to the map information unit 200.

Furthermore, in a case where the sensor information of the sensor unit 100 exceeds certain reliability, the intersection model generation unit 330 stores the sensor information in the map information unit 200. The sensor information stored in the map information unit 200 is reused, and thus, the intersection model generation unit 330 enables the intersection model generation unit 330 to use, as prior knowledge, the lane width or the like corresponding to the road before the sensor unit 100 senses the lane width or the like by the vehicle traveling this time.

However, it is difficult to know whether or not the lane width of the road or the like is accurately obtained only once the host vehicle travels. For example, the lane width included in the sensor information may be a provisional lane width during construction. In addition, in the sensor information, a possibility that the sensor unit 100 observes incorrect information or a possibility that information different from an original lane is observed due to a white line hidden by a parked vehicle is also assumed. Assuming such a case, the intersection model generation unit 330 increases the reliability for the sensor information (sensor information) by repeating confirmation that the recognized lane width at the time of traveling exceeds certain reliability and confirmation that the same lane width is recognized when the host vehicle passes the same road at the same time. This reliability is added to, for example, the sensor information stored in the map information unit 200. Note that, since sensor information is not stored in the map information unit 200 on a road on which the host vehicle merely travels once, the intersection model generation unit 330 often recognizes this sensor information as low reliability.

The intersection model generation unit 330 acquires the model additional information from the model additional information acquisition unit 331, and then generates the intersection model based on the selection result of the model selection unit 323. Here, in a case where the distance is within a predetermined value, the model generation unit (intersection model generation unit 330) includes the high-resolution model generation unit (high-resolution model generation unit 333) that generates the first model corresponding to a specific road present in front of the host vehicle position and observed by the sensor unit (sensor unit 100). In addition, in a case where the distance is larger than the predetermined value, the model generation unit (intersection model generation unit 330) includes the low-resolution model generation unit (low-resolution model generation unit 334) that generates the second model corresponding to a specific road that cannot be observed by the sensor unit (sensor unit 100).

The generation of the intersection model is performed by the high-resolution model generation unit 333 or the low-resolution model generation unit 334. In a case where the sensor unit 100 can observe the road width on the side of the intersection and in a case where the model selection unit 323 selects the first model, the intersection model is generated by the high-resolution model generation unit 333. On the other hand, in a case where the sensor unit 100 cannot observe the road width on the side of the intersection and in a case where the model selection unit 323 selects the second model, the intersection model is generated by the low-resolution model generation unit 334.

<Expression Method of Intersection Model>

Here, a method for expressing the intersection model generated by the intersection model generation unit 330 will be described with reference to FIG. 19.

Figure 19:
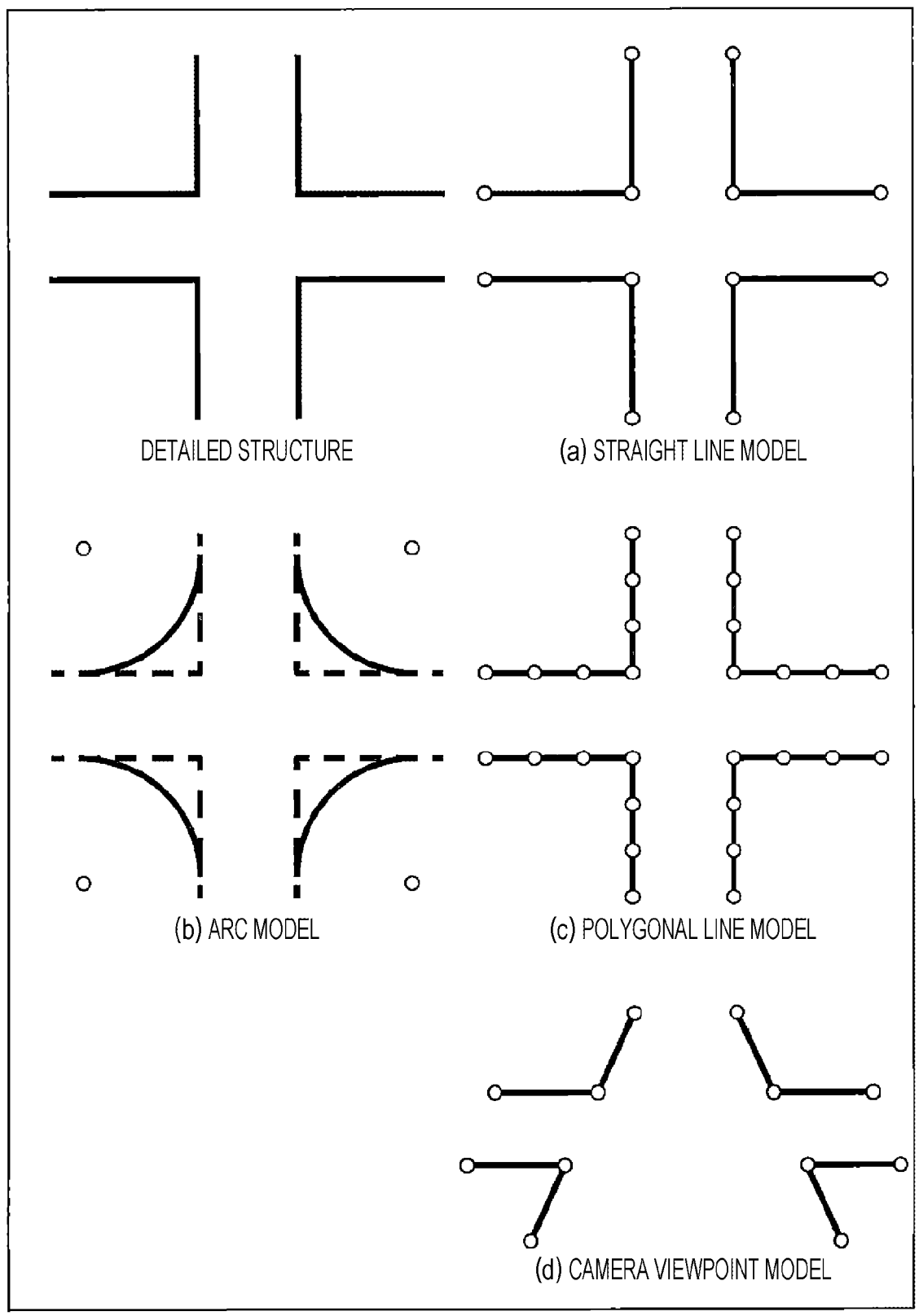
FIG. 19 is a diagram illustrating an example of a detailed structure of an intersection and an intersection model according to the embodiment of the present invention.

FIG. 19 is a diagram illustrating an example of the detailed structure of the intersection and the intersection model.

An example of the detailed structure of the intersection is illustrated in an upper left side of FIG. 19. The detailed structure of the intersection is restored by adding the additional information acquired by the model additional information acquisition unit 331 to the basic structure represented by the node and link information.

A model diagram (a) of FIG. 19 illustrates an example of a straight line model. In a case where the intersection model generation unit 330 expresses the detailed structure of the intersection with a straight line, the straight line model illustrated in the model diagram (a) is used. This straight line model is used to estimate the shape of the intersection where the surroundings present in a residential area are surrounded by walls or fences of a house.

A model diagram (b) of FIG. 19 illustrates an example of an arc model. In a case where the intersection model generation unit 330 expresses the detailed structure of the intersection with an arc, the arc model illustrated in the model diagram (b) is used. In a larger intersection than an intersection in a residential area, such as a major arterial road, corners of the intersection are designed in an arc shape. Thus, the arc model is used to estimate the shape of the intersection of which the corners are designed in the arc shape.

A model diagram (c) of FIG. 19 illustrates an example of a polygonal line model. In a case where the detailed structure of the intersection is expressed by a polygonal line, the polygonal line model illustrated in the model diagram (c) is used. In a case where the intersection model generation unit 330 desires to express a more detailed intersection shape, such as a curve mirror or a sign present inside the intersection, or right and left turning lanes added before the intersection, the polygonal line model is used.

A model diagram (d) in FIG. 19 illustrates an example of a camera viewpoint model. In a case where it is desired to express the intersection model as viewed from a camera viewpoint, the camera viewpoint model illustrated in the model diagram (d) may be used.

The intersection model generation unit 330 may select one model based on the road width of the intersection acquired by the model additional information acquisition unit 331 from each model having a different method for expressing the detailed structure of the intersection illustrated in FIG. 19. For example, in a case where the model additional information acquisition unit 331 estimates that the road width on one side is about one lane, since there is a high possibility that the surroundings present in the residential area is the intersection surrounded by the walls or the fence of the house, the intersection model generation unit 330 selects the straight line model. In addition, in a case where the model additional information acquisition unit 331 estimates that the road width is two lanes or more on one side, since there is a high possibility that the intersection is a larger intersection than the intersection in the residential area such as the major arterial road, the intersection model generation unit 330 selects the arc model.

In addition, the intersection model generation unit 330 may select a model based on an application to be used. For example, in a case where an application having a locator function of determining erroneous estimation of the host vehicle position based on consistency between the map and the sensor input is used, the intersection model generation unit 330 may be able to estimate an outline of the intersection. Thus, the intersection model generation unit 330 selects the straight line model or the arc model to generate the intersection model. In addition, in a case where the model is used for vehicle control that enables the vehicle to automatically turn right or left at the intersection, the intersection model generation unit 330 may select the polyline model that can estimate the detailed shape of the intersection and can generate the intersection model.

<Method for Generating Plurality of Intersection Models>

Here, a method for generating models generated by the high-resolution model generation unit 333 and the low-resolution model generation unit 334 will be described with reference to FIG. 20.

Figure 20:
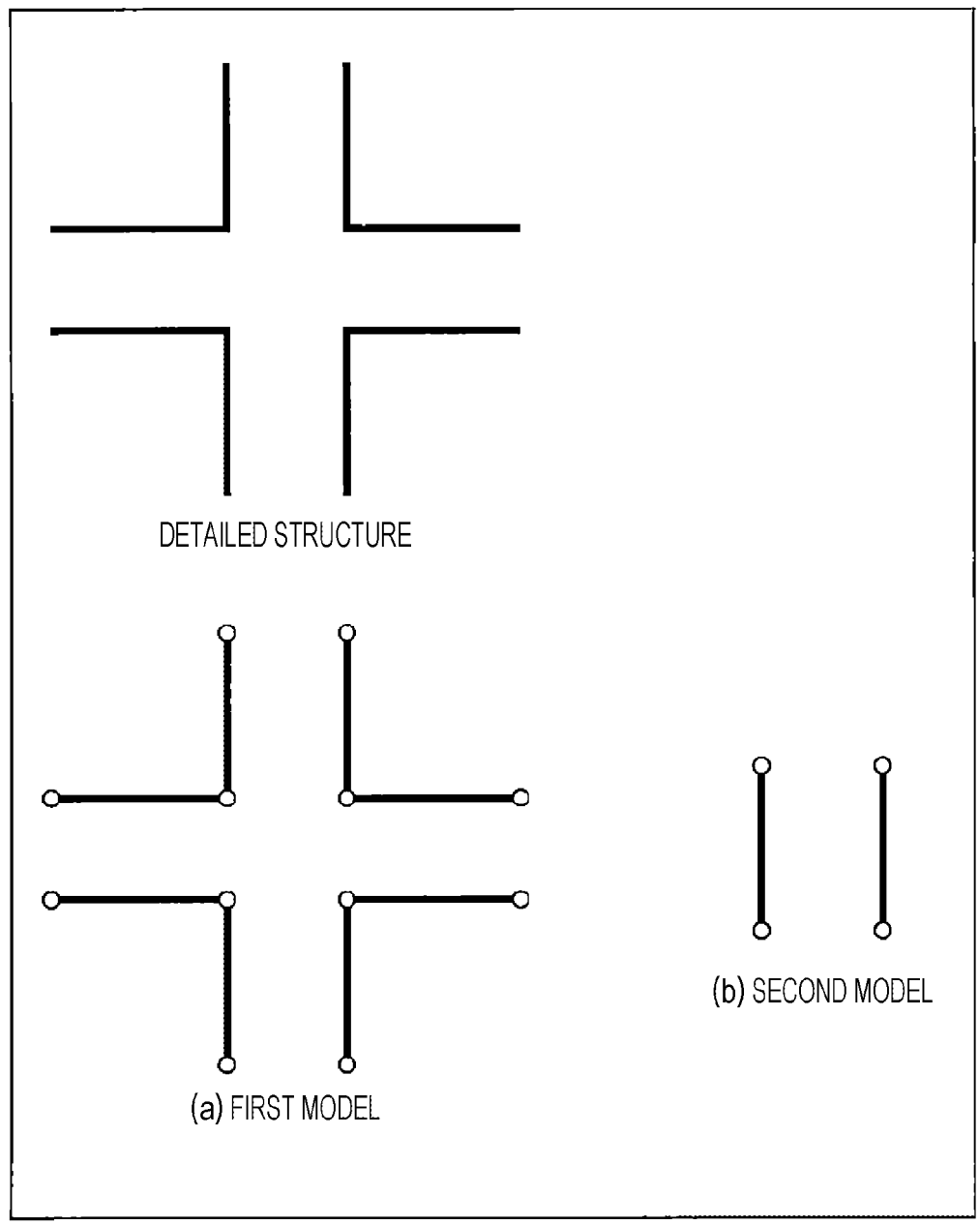
FIG. 20 is a diagram illustrating examples of a first model and a second model generated from the detailed structure of the intersection according to the embodiment of the present invention.

FIG. 20 is a diagram illustrating examples of the first model and the second model generated from the detailed structure of the intersection. An upper left side of FIG. 20 illustrates an example of a detailed structure of an intersection similar to the intersection illustrated in the upper left side of FIG. 19.

A model diagram (a) of FIG. 20 illustrates an example of the first model. The high-resolution model generation unit 333 generates the first model used as an example of the high-resolution model based on the detailed structure of the intersection illustrated in the upper left of FIG. 20. A model diagram (a) of FIG. 20 illustrates a case where the high-resolution model generation unit 333 expresses the first model of the cross intersection by the straight line model illustrated in the model diagram (a) of FIG. 19. However, the high-resolution model generation unit 333 may use models with different expression methods illustrated in the model diagrams (b), (c), and (d) of FIG. 19 depending on road width information and an appropriate application.

A model diagram (b) in FIG. 20 illustrates an example of the second model. The low-resolution model generation unit 334 generates the second model used as an example of the low-resolution model based on the detailed structure of the intersection illustrated in the upper left of FIG. 20. The model diagram (b) of FIG. 20 illustrates a case where the low-resolution model generation unit 334 expresses the second model of the cross intersection by the straight line model illustrated in the model diagram (a) of FIG. 19. However, the low-resolution model generation unit 334 may use models with different expression methods illustrated in the model diagrams (b), (c), and (d) of FIG. 19 depending on road width information and an appropriate application.

<Examples of First Model and Second Model Corresponding to Type of Intersection>

Although the cross intersection is illustrated in FIG. 20, the low-resolution model generation unit 334 can generate the first model and the second model in consideration of the sensor resolution for other intersection types.

Figure 21:
FIG. 21 is a diagram illustrating examples of a first model and a second model generated for each type of the intersection according to the embodiment of the present invention.

FIG. 21 is a diagram illustrating examples of the first model and the second model generated for each type of the intersection.

FIG. 21 illustrates an example of the first model generated by the high-resolution model generation unit 333 and the second model generated by the low-resolution model generation unit 334 for each type of the intersection such as the cross or the T-shape provided for each of a four-way intersection, a three-way intersection, and other intersections. Since the first model is generated when the vehicle approaches the intersection, the shape of the intersection is close to the detailed structure. On the other hand, since the second model is generated when the vehicle is distant from the intersection, the shape of the intersection is rough. Thus, an intersection model close to the detailed structure of the intersection is obtained by generating the second model when the vehicle is distant from the intersection and generating the first model when the vehicle approaches the intersection.

<Intersection Shape Estimation Unit 400>

Next, a configuration example and an operation example of the intersection shape estimation unit 400 will be described with reference to FIG. 8.

Figure 8:
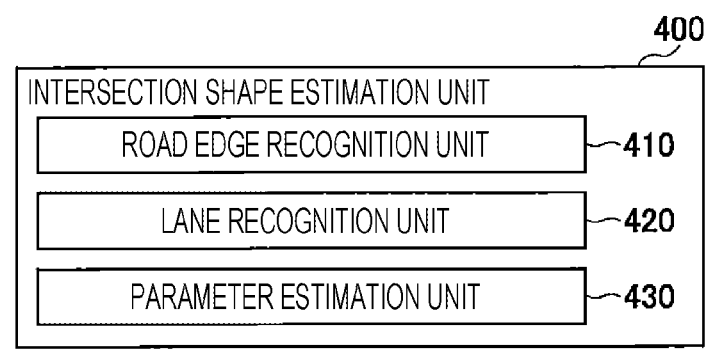
FIG. 8 is a block diagram illustrating a configuration example of an intersection shape estimation unit according to the embodiment of the present invention.

FIG. 8 is a block diagram illustrating a configuration example of the intersection shape estimation unit 400.

The road shape estimation unit (intersection shape estimation unit 400) outputs the road model (intersection model) in which the road shape (intersection shape) is estimated based on the sensor information and the road model (intersection model) generated by the model generation unit (intersection model generation unit 330), and accuracy information related to the estimation result. Thus, the intersection shape estimation unit 400 fits the intersection model generated by the intersection model generation unit 330 to a feature of the intersection indicated by the sensor information acquired from the sensor unit 100. At this time, the intersection shape estimation unit 400 estimates parameters (for example, two-dimensional coordinates of a node that can express the model illustrated in FIG. 19 to be described later) constituting the intersection model. The intersection shape estimation unit 400 includes a road edge recognition unit 410, a lane recognition unit 420, and a parameter estimation unit 430.

(Operation Example of Road Edge Recognition Unit 410)

Here, an operation example of the road edge recognition unit 410 will be described.

The intersection shape estimation unit 400 obtains a road edge feature used for model fitting of the intersection by using the road edge recognition unit 410. The road edge feature is information obtained by the road edge recognition unit 410 extracting a three-dimensionally high step portion and a three-dimensionally low step portion for the road from the sensor information as features of the road edge. Thus, in a case where there are a road shoulder for the road and a wall and the like on the side of the road shoulder, the road edge recognition unit 410 extracts features of both the road shoulder and the wall from the sensor information. In addition, the road edge recognition unit 410 also extracts, as the features, various three-dimensional objects such as a wall, a building, a tree, a utility pole, and a side groove from the sensor information.

Since an important step for the host vehicle traveling on the road is a step that comes into contact with the host vehicle at the center, it is important for the host vehicle to travel not to come into contact with the step. Thus, the road edge recognition unit 410 emphasizes a step having a possibility of coming into contact with the host vehicle at the beginning with the host vehicle as the center, and performs noise removal processing of deleting a three-dimensional object present at a position far from the host vehicle than the step.

After these pieces of processing are performed, the road edge recognition unit 410 uses, as a point group of the road edge, a step having a possibility of coming into contact with the host vehicle at the beginning with the host vehicle as the center. Furthermore, the road edge recognition unit 410 constitutes the road edge point group of the road in time series by using the point group of the road edge for the host vehicle behavior or using a corresponding point of the image. The parameter estimation unit 430 estimates the parameters of the intersection model by fitting the road edge point group formed in time series and the intersection model generated by the intersection model generation unit 330.

(Operation Example of Lane Recognition Unit 420)

Next, an operation example of the lane recognition unit 420 will be described.

Similarly to the processing of estimating the intersection shape by using the recognition result of the road edge recognition unit 410, the intersection shape estimation unit 400 may use the lane feature recognized by the lane recognition unit 420 for fitting of the intersection model. The lane recognition unit 420 detects point groups of points that are features of a boundary line between lanes along the traveling direction of the host vehicle or a boundary line between a lane and a road shoulder. Further, the lane recognition unit 420 generates a lane feature continuously connecting the detected point groups in time series by using the behavior of the host vehicle, and recognizes the lane based on the lane feature. The parameter estimation unit 430 can estimate the parameters of the intersection model by fitting the generated lane feature with the intersection model.

(Operation Example of Parameter Estimation Unit 430)

Next, an operation example of the parameter estimation unit 430 will be described.

The parameter estimation unit 430 acquires the road edge feature from the road edge recognition unit 410 and acquires the lane feature from the lane recognition unit 420. The parameter estimation unit 430 obtains the parameters (two-dimensional coordinates of the node illustrated in FIG. 19) of the intersection model that most fits these acquired features. Thereafter, as illustrated in FIG. 1, the intersection shape estimation unit 400 outputs the parameters of the estimated intersection model and model selection information indicating which of the first model, the second model, and the third model is selected as the intersection model to the intersection consistency determination unit 500. In addition, in a case where a fitting degree of the intersection model to the sensor information can be calculated, the intersection shape estimation unit 400 also outputs the fitting degree to the intersection consistency determination unit 500.

Note that, the processing performed by the intersection shape estimation unit 400 may include processing of estimating the intersection shape without using the information of the map information unit 200. In this case, the intersection model generation unit 330 may output the intersection model generated by the intersection model generation unit 330 to the intersection consistency determination unit 500 as it is together with the intersection shape estimated by the sensor unit 100 without causing the parameter estimation unit 430 to perform parameter estimation.

<Configuration Example and Operation Example of Intersection Consistency Determination Unit 500>

Next, a configuration example and an operation example of the intersection consistency determination unit 500 will be described with reference to FIG. 9.

Figure 9:
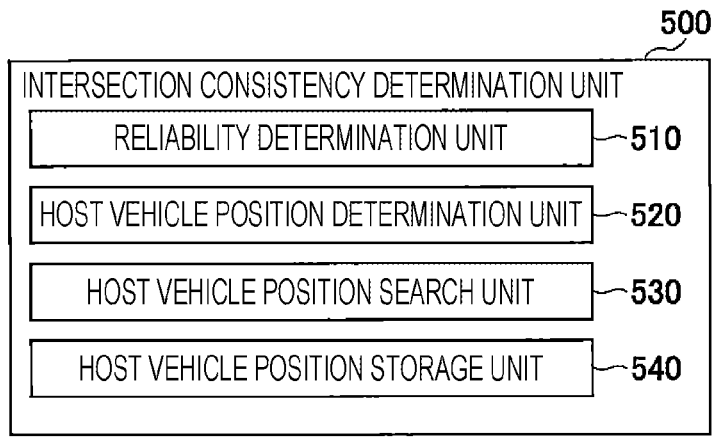
FIG. 9 is a block diagram illustrating a configuration example of an intersection consistency determination unit according to the embodiment of the present invention.

FIG. 9 is a block diagram illustrating a configuration example of the intersection consistency determination unit 500.

The consistency determination unit (intersection consistency determination unit 500) determines consistency between a plurality of roads (intersections) present in front of the host vehicle in the traveling direction. The intersection consistency determination unit 500 includes a reliability determination unit 510, a host vehicle position determination unit 520, a host vehicle position search unit 530, and a host vehicle position storage unit 540.

(Operation Example of Reliability Determination Unit 510)

The reliability determination unit 510 determines consistency between the intersection model used for the shape estimation of the intersection and the sensor information acquired from the sensor unit 100 based on the estimation result input from the intersection shape estimation unit 400.

In a case where the reliability determination unit 510 can acquire the first model after the intersection shape is estimated by the intersection shape estimation unit 400, consistency determination is performed based on the acquired road width of the first model. For example, a case where the intersection of which the shape is estimated by the intersection shape estimation unit 400 is a cross intersection where two (two lanes) roads intersect will be described.

For example, the reliability determination unit 510 assumes that there is a road narrower than a vehicle width of the host vehicle with respect to road widths of four roads (two roads in a traveling direction and a reverse direction of the host vehicle and two roads in a right direction and a left direction intersecting these two roads at an intersection) present at the cross intersection. In this case, it is considered that since the model used by the intersection shape estimation unit 400 to estimate the shape of the intersection is incorrect or a lot of noise is included in the sensor information acquired from the sensor unit 100, the model fits to a feature that is not the intersection. Thus, the reliability determination unit 510 determines that the intersection model and the sensor information are not consistent with each other. In addition, when the reliability determination unit 510 compares the road widths of two roads through which the host vehicle passes when the host vehicle travels straight through the intersection with respect to four roads present in the cross intersection, the road width acquired from the intersection model may be greatly different from an actual road width estimated from the sensor information. In this case, the reliability determination unit 510 may determine that the intersection model and the sensor information are not consistent with each other.

In addition, in a case where the reliability determination unit 510 can acquire the second model after the intersection shape is estimated by the intersection shape estimation unit 400, the consistency determination is performed based on the road width of the acquired second model, similarly to the determination processing performed by the first model. However, as described with reference to FIG. 20, the second model is a model that expresses a cross intersection with two straight lines. Thus, the reliability determination unit 510 determines consistency by comparing a distance between two straight lines with the vehicle width of the host vehicle.

In addition, in a case where the reliability determination unit 510 can acquire the third model after the intersection shape is estimated by the intersection shape estimation unit 400, the consistency determination of the first model is performed in a case where the distance from the host vehicle position to the intersection is smaller than the first distance. In a case where the distance from the host vehicle position to the intersection is larger than the first distance, the reliability determination unit 510 determines the consistency similarly to the consistency determination of the second model.

In addition, the reliability determination unit 510 may perform consistency determination between the map information and the intersection model by comparing the map information acquired from the map information unit 200 with the intersection model after the intersection shape is estimated by the intersection shape estimation unit 400. In a case where the cross intersection is present in front of the host vehicle in the map information unit 200, connection angles of four roads present at the cross intersection are right angles. Thus, the reliability determination unit 510 may determine that the consistency is not obtained in a case where the connection angle of the intersection model after the model estimation by the intersection shape estimation unit 400 is greatly deviated from the right angle.

In addition, the map information unit 200 may include information (road width information, type and grade of road in the Road Structure Ordinance, road width estimation result at the time of previous traveling, and the like) by which the road width can be estimated. Thus, the reliability determination unit 510 may perform consistency determination between the road width information and the intersection model by reading the map information unit 200 and comparing the road width information acquired from the information from which the road width can be estimated with the intersection model after the model estimation by the intersection shape estimation unit 400.

In addition, in a case where the reliability related to the estimation result can be acquired from the intersection shape estimation unit 400, the reliability determination unit 510 may set a threshold value for the reliability and may perform the consistency determination. In addition, in a case where the intersection model generated by the intersection model generation unit 330 and the intersection shape estimated by the sensor unit 100 can be acquired from the intersection shape estimation unit 400, the reliability determination unit 510 may perform consistency determination between the intersection model and the intersection shape by comparing the intersection model and the intersection shape.

(Operation Example of Host Vehicle Position Determination Unit 520)

Next, an operation example of the host vehicle position determination unit 520 will be described.

The intersection model generation unit 330 according to the present embodiment generates the intersection model in front of the host vehicle while referring to the map information unit 200 based on the host vehicle position processed by the intersection information processing unit 300, and then the intersection shape estimation unit 400 estimates the intersection shape. Thus, in a case where the host vehicle position on the map is incorrect, the intersection model generation unit 330 may acquire intersection information different from the intersection in front of the host vehicle from the map information unit 200, and may generate an incorrect intersection model. Thus, the reliability determination unit 510 determines whether the host vehicle position is correct or incorrect by determining consistency between the intersection model used for the shape estimation of the intersection and the sensor information acquired from the sensor unit 100.

Meanwhile, the amount of information required for consistency determination of the intersection consistency determination unit 500 is different between consistency in a case where the first model is used for the shape estimation of the intersection by the intersection shape estimation unit 400 and consistency in a case where the second model is used for the shape estimation. For example, in the case of the first model, since the host vehicle is approaching the intersection than the first distance, the intersection shape estimation unit 400 can estimate the shape including the road width on the side of the intersection. Thus, for example, in a case where the reliability determination unit 510 determines that the cross intersection model and the sensor information are consistent with each other, the intersection consistency determination unit 500 can conclude that the cross intersection is present in front of the host vehicle.

On the other hand, in the case of the second model, it is not possible to estimate the shape including the road width on the side of the intersection. Thus, as illustrated in FIG. 21, exactly the same intersection model is used for the cross intersection and a T-Right intersection. When exactly the same intersection model is used for the cross intersection and the T-Right intersection, there is a possibility that the intersection is the cross intersection or the T-Right intersection even in a case where the reliability determination unit 510 determines that the cross intersection model and the sensor information are consistent with each other. Thus, the reliability determination unit 510 cannot conclude that the intersection present in front of the host vehicle is the cross intersection.

Note that, the same second model is applied to road shapes of three types of a T-shape, a corner, and a dead end. Thus, even though the shape of the intersection is the T-shape, since the second model having the same shape as the corner and the dead end is selected, the reliability determination unit 510 cannot conclude that the intersection present in front of the host vehicle is the T-shaped intersection. The reason why the reliability determination unit 510 cannot conclude the intersection present in front of the host vehicle as described above is the same in the relationship between the cross intersection and the T-Right intersection.

However, in a case where the sensor information that can be acquired from the sensor unit 100 and that is output by observing the front of the host vehicle by the sensor at a present point in time is used, the reliability determination unit 510 can determine that the intersection present distant from the host vehicle is not incorrect at the cross intersection. Conversely, even in a case where the second model of the cross intersection is acquired, the shape of the cross that is the second model is different from the shape of the T-shape, the corner, or the dead end. Thus, the reliability determination unit 510 can determine that the shape of the second model generated when the intersection present distant from the host vehicle is the cross intersection does not correspond to any shape of the second model formed when the road shape is the T-shape, the corner, or the dead end. Thus, the reliability determination unit 510 can limit shape candidates of a distant intersection.

Thus, the consistency determination unit (intersection consistency determination unit 500) includes the host vehicle position determination unit (host vehicle position determination unit 520) that determines whether the host vehicle position is correct or incorrect based on a result of the consistency determination of the road and outputs a determination result of the host vehicle position. For example, the host vehicle position determination unit 520 acquires the type information (one of the first model, the second model, and the third model) of the model selected from the reliability determination unit 510 and the consistency determination result by the intersection consistency determination unit 500, determines whether the host vehicle position is correct or incorrect, and outputs the determination result. Hereinafter, a detailed example of processing performed by the host vehicle position determination unit 520 will be described.

First, in a case where a result of determination that the first model is used for the shape estimation and the first model and the sensor information are consistent with each other can be acquired from the reliability determination unit 510, the host vehicle position determination unit 520 outputs a determination result of determination that the host vehicle position is correct. On the other hand, in a case where a result of determination that the first model is used for the shape estimation and the first model and the sensor information are not consistent with each other can be acquired from the reliability determination unit 510, the host vehicle position determination unit 520 outputs a determination result of determination that the host vehicle position is incorrect.

In addition, in a case where a result of determination that the second model is used for the shape estimation and the second model and the sensor information are consistent with each other can be acquired from the reliability determination unit 510, the host vehicle position determination unit 520 considers that the host vehicle position is correct at a present point in time. Thus, the host vehicle position determination unit 520 outputs the result of determination that the host vehicle position is correct. In addition, the host vehicle position determination unit 520 considers that the host vehicle position is not incorrect at a present point in time but may not be able to confirm that the host vehicle position is correct. In this case, the host vehicle position determination unit 520 may output the result of determination that the host vehicle position is unconfirmed.

In addition, it is assumed that the host vehicle position determination unit 520 acquires information indicating that the third model is used for the shape estimation from the reliability determination unit 510. At this time, the host vehicle position determination unit 520 performs host vehicle position determination of the first model in a case where the distance from the host vehicle position to the intersection is smaller than the first distance, and performs consistency determination similarly to the host vehicle position determination of the second model in a case where the distance is larger than the first distance.

Here, an example of processing of determining whether the host vehicle position is correct or incorrect by the host vehicle position determination unit 520 will be described with reference to FIG. 22.

Figure 22:
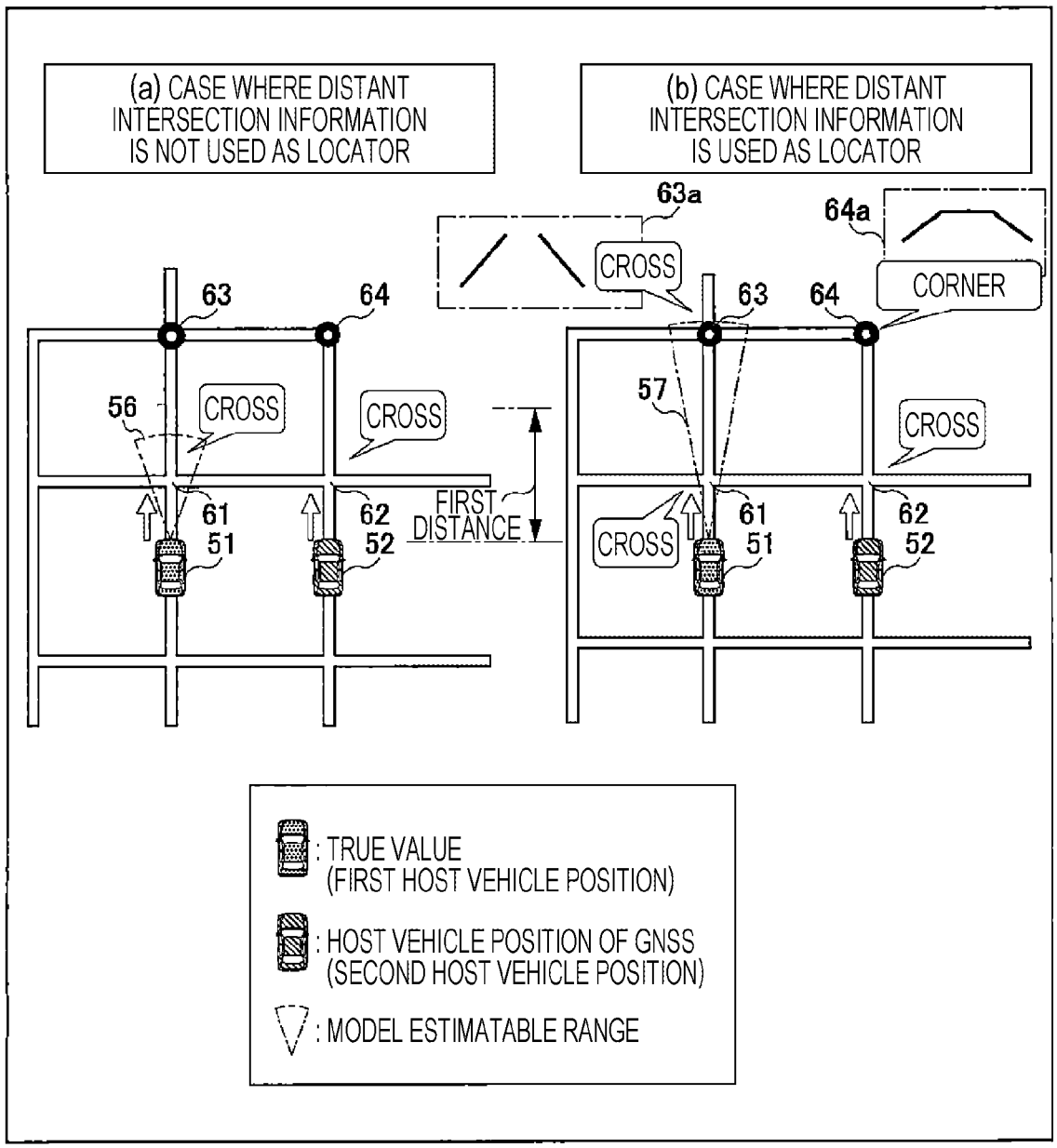
FIG. 22 is a diagram illustrating an example of processing of determining whether a host vehicle position is correct or incorrect based on an intersection present in front of a host vehicle by a host vehicle position determination unit according to the embodiment of the present invention.

FIG. 22 is a diagram illustrating an example of processing of determining whether the host vehicle position is correct or incorrect based on the intersection in front of the host vehicle by the host vehicle position determination unit 520. In the drawing, a true host vehicle position (hereinafter, referred to as a "first host vehicle position") at which the host vehicle is actually present and a host vehicle position (hereinafter, referred to as a "second host vehicle position") incorrectly estimated by the GNSS are illustrated.

An explanatory diagram (a) illustrated on a left side of FIG. 22 illustrates an example of processing in a case where the host vehicle position determination unit 520 does not use distant intersection information for a locator. Not using the distant intersection information for the locator means that the host vehicle position determination unit 520 does not use the intersection information of the distant intersection for determining the host vehicle position on the map.

In the drawing, the first host vehicle position is indicated by a vehicle icon 51, and the second host vehicle position is indicated by a vehicle icon 52. An intersection 61 is present in front of the first host vehicle position, and an intersection 63 is present in the distance. In addition, an intersection 62 is shown in front of the second host vehicle position, and a corner 64 is shown in the distance. Further, a range 56 in which the information processing device 1 can estimate the intersection model is shown in the vehicle icon 51. The range 56 is substantially equal to a range that can be observed by the sensor unit 100. The range 56 including the intersection 61 present in front of the host vehicle represented by the first host vehicle position is observed by the sensor unit 100.

In a case where there are a plurality of intersections of the same type (for example, cross intersections) around the host vehicle shown on the map, the host vehicle position determination unit 520 may incorrectly perform the host vehicle position determination. In the example illustrated in FIG. 22, the cross intersections 61 and 62 are present in front of the vehicle icons 51 and 52 on the map. Here, it is assumed that the intersection model generation unit 330 generates the intersection model based on the cross intersection 62 present in front of the second host vehicle position (vehicle icon 52). In this case, since the cross intersection 61 is also present in front of the first host vehicle position (vehicle icon 51), the reliability determination unit 510 determines that the generated intersection model is consistent with the sensor information.

As a result, the host vehicle position determination unit 520 determines that the host vehicle position determined as the second host vehicle position is correct even though the host vehicle position is actually the first host vehicle position. As described above, in the explanatory diagram (a), since information on the distant intersections 63 and 64 is not used for the locators, only when the host vehicle travels straight beyond the first intersection 61 and approaches the intersection 63, the host vehicle recognizes that the host vehicle position is incorrect. Thus, in a case where the information on the distant intersection is not used for the locator and the intersection of the same type (such as a cross) is present around the host vehicle, it is difficult to specify the host vehicle position.

Next, a countermeasure against the operation in which the host vehicle position determination unit 520 incorrectly determines the host vehicle position will be described with reference to an explanatory diagram (b) illustrated on a right side of FIG. 22. Here, it is assumed that the host vehicle position determination unit 520 uses the intersection information of the intersection present distant for the locator and determines whether the host vehicle position is correct or incorrect based on consistency between a plurality of intersections present in front of the host vehicle. Using the intersection information for the locator means that the host vehicle position determination unit 520 uses the intersection information to determine whether the host vehicle position on the map is correct or incorrect.

The explanatory diagram (b) illustrates a situation in which the cross intersection is at a position where the distance from the host vehicle is less than the first distance and the cross intersection is at a position where the distance from the host vehicle is equal to or greater than the first distance in front of the first host vehicle position (vehicle icon 51). In addition, the explanatory diagram (b) illustrates a situation in which the cross intersection 62 is at a position where the distance from the host vehicle is less than the first distance and the corner 64 is at a position where the distance from the host vehicle is equal to or greater than the first distance in front of the second host vehicle position (vehicle icon 52). A model estimable range 57 in which the information processing device 1 can estimate the intersection model is shown in the vehicle icon 51. The model estimable range 57 including the intersections 61 and 63 present in front of the host vehicle is observed by the sensor unit 100.

Here, a case where the intersection model generation unit 330 generates the intersection model at the second host vehicle position indicated by the vehicle icon 52 will be considered. In this case, the intersection model generation unit 330 generates a cross intersection model 63a that is the first model based on the cross intersection 62 present in front as viewed from the host vehicle, and generates a corner model 64a that is the second model based on the distant corner 64 as viewed from the host vehicle.

On the other hand, since the cross intersection 61 is present in front of the first host vehicle position (vehicle icon 51) where the vehicle is actually present, the reliability determination unit 510 determines that the consistency of the cross intersection of the first model is obtained. However, the cross intersection 63 is present distant from the first host vehicle position.

In a case where the host vehicle position determination unit 520 determines that the host vehicle position on the map is the second host vehicle position (vehicle icon 52), the shape of the corner model 64a of the second model generated from the corner 64 by the intersection model generation unit 330 is different from the shape of the cross intersection model 63a of the second model generated from the cross intersection 63. Thus, the reliability determination unit 510 determines that the corner model 64a of the second model is not consistent with the shape of the intersection 63 observed by the sensor unit 100 in the model estimable range 57. As a result, the host vehicle position determination unit 520 can determine that the host vehicle position is incorrect. As described above, the host vehicle position determination unit 520 can determine whether the host vehicle position is correct or incorrect by confirming consistency between the intersection information of consecutive intersections present in front of the host vehicle and the map and the sensor information.

FIG. 22 illustrates an example of processing of determining the host vehicle position by using two intersections of the intersection 61 near than the first distance and the intersection 63 distant than the first distance by the host vehicle position determination unit 520. However, the number of intersections used for the host vehicle position determination by the host vehicle position determination unit 520 may be two or more intersections present near the host vehicle position than the first distance, or may be two or more intersections present distant than the first distance. In addition, all two or more intersections may be near the host vehicle position than the first distance, or all two or more intersections may be distant than the first distance. In addition, the host vehicle position determination unit 520 may retain a result of the reliability determination unit 510 determined based on the plurality of intersections through which the host vehicle passes in the past, and may determine whether the host vehicle position is correct or incorrect together with the time-series information in the past.

(Operation Example of Host Vehicle Position Search Unit 530)

Here, in a case where the host vehicle position determination unit 520 determines that the host vehicle position on the map is incorrect, the host vehicle position search unit 530 illustrated in FIG. 9 searches for a current position (hereinafter, referred to as a "third host vehicle position") of the host vehicle having the highest possibility on the map.

Here, an operation example of the host vehicle position search unit 530 will be described with reference to FIG. 23.

Figure 23:
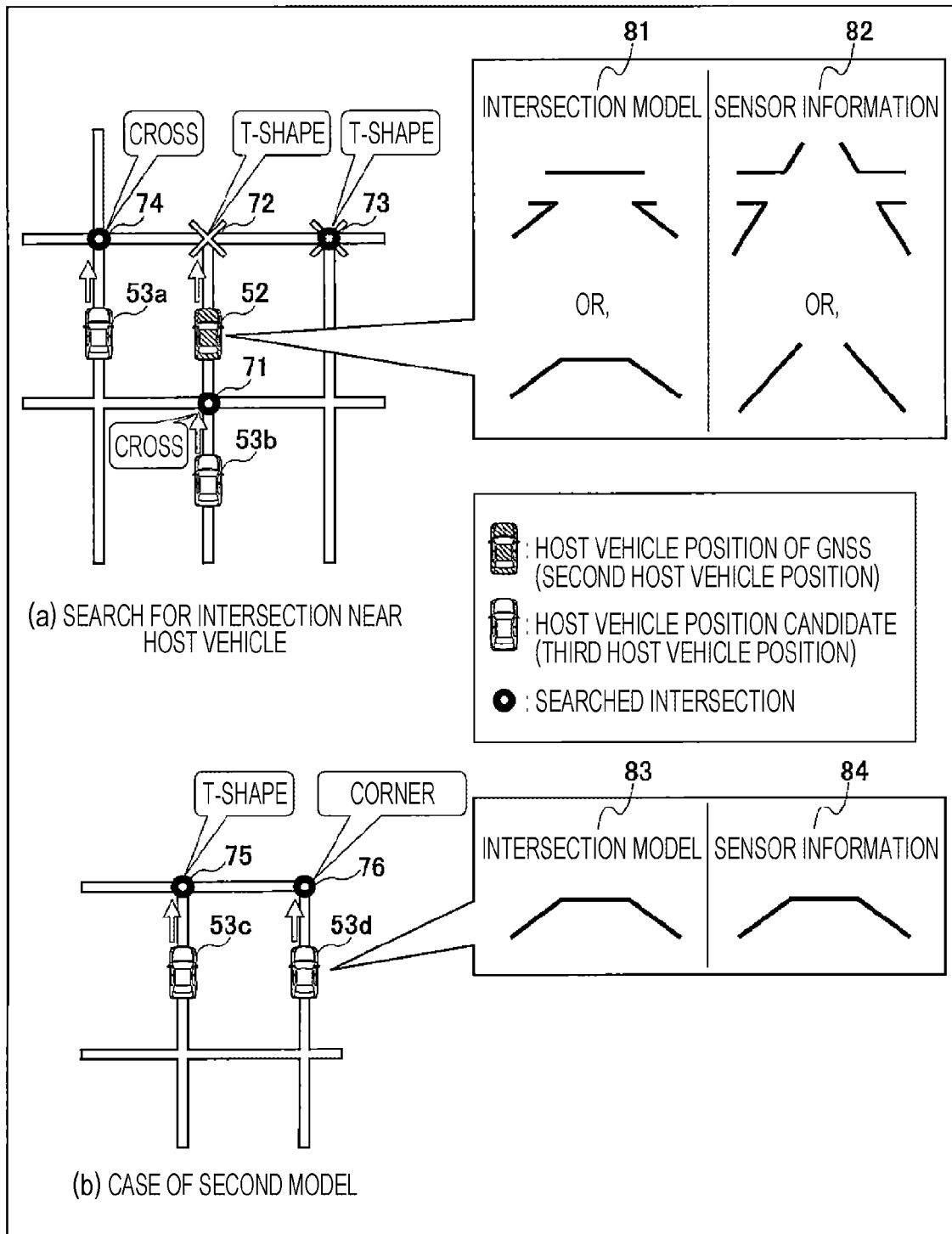
FIG. 23 is a diagram illustrating an operation example of a host vehicle position search unit according to the embodiment of the present invention.

FIG. 23 is a diagram illustrating an operation example of the host vehicle position search unit 530.

As illustrated in an explanatory diagram (a) of FIG. 23, a T-shaped intersection 72 is present in front of the second host vehicle position (vehicle icon 52). Thus, the first model of the T-shaped intersection 72 or the second model of the T-shaped intersection 72 is generated in accordance with the distance from the second host vehicle position to the intersection. At this time, when the sensor information indicating that the sensor unit 100 observes the cross intersection is input, the host vehicle position determination unit 520 determines that the shape of the intersection determined by the sensor information 82 is different from the shape of the intersection model 81. Thus, the host vehicle position determination unit 520 outputs information indicating that the second host vehicle position is incorrect to the host vehicle position search unit 530.

In a case where the host vehicle position determination unit 520 determines that the host vehicle position specified on the map represented by the map information is incorrect, the consistency determination unit (intersection consistency determination unit 500) includes the host vehicle position search unit (host vehicle position search unit 530) that searches for a correct host vehicle position on the map based on a result of the consistency determination of the road. Thus, when information indicating that the host vehicle position is incorrect is received from the host vehicle position determination unit 520, the host vehicle position search unit 530 determines the third host vehicle position that is a candidate for the host vehicle position by searching for an intersection adjacent to the intersection 72 present in front of the second host vehicle position on the map. Here, the host vehicle position search unit 530 recognizes, as an intersection adjacent to the intersection 72, an intersection within a distance that the host vehicle can reach in one step (for example, one section on the map) on a graph structure indicating a road relationship indicated by the node and the edge.

As illustrated in the explanatory diagram (a) of FIG. 23, one T-shaped intersection 73 and two cross intersections 71 and 74 are present at the intersection adjacent to the intersection 72 present in front of the second host vehicle position. Thus, the intersection model generation unit 330 generates the first model or the second model in accordance with the distance from the second host vehicle position to each intersection. The intersection consistency determination unit 500 determines consistency between the generated first model or second model and the sensor information.

Here, the intersection model generated by the intersection model generation unit 330 and the sensor information are not consistent at two cross intersections 71 and 74. Thus, the host vehicle position search unit 530 determines, as third host vehicle positions 53a and 53b, positions in front of the cross intersections 71 and 74 consistent with the sensor information. The host vehicle position search unit 530 outputs two third host vehicle positions 53a and 53b illustrated in the explanatory diagram (a) to the display, warning, and control unit 600.

Note that, the host vehicle position search unit 530 may output the third host vehicle position only in a case where only one third host vehicle position is determined as a result of searching for the host vehicle position, and may output information indicating that the host vehicle position is unconfirmed in a case where there are a plurality of third host vehicle positions. In addition, the host vehicle position search unit 530 may store the information output to the display, warning, and control unit 600 in the host vehicle position storage unit 540.

An explanatory diagram (b) of FIG. 23 illustrates a scene in which the host vehicle position search unit 530 searches for the host vehicle position by using the second model. When the second model is selected by the model selection unit 323, the intersection model generation unit 330 generates an intersection model 83 in which both a T-shaped intersection 75 and a corner 76 have the same shape as illustrated in FIG. 23, for example. Even though the type of the intersection present in front of the host vehicle is different on the map (T-shaped intersection 75 and corner 76), in a case where the shape of the intersection indicated by sensor information 84 is the same as the shape of the intersection model 83, the host vehicle position search unit 530 outputs, as candidates for the host vehicle position, both of two third host vehicle positions 53c and 53d.

Although not illustrated in the drawing, when the distance from the true host vehicle position to the intersection falls below the first distance, an output result of one of the third host vehicle positions 53c and 53d cannot represent the correct third host vehicle position. In addition, in a case where the intersection present in front of the first host vehicle position is the dead end, when the distance from the host vehicle position to the intersection falls below the first distance, both the output results are not the third host vehicle position. Thus, in a case where the second model is selected, the host vehicle position search unit 530 may output not only the third host vehicle position but also information indicating the third host vehicle position estimated by the second model.

In addition, the intersection searched for by the host vehicle position search unit 530 from the surroundings of the host vehicle position may not be limited only to the intersection adjacent to the intersection present in front of the second host vehicle position. For example, an intersection present within a distance that the host vehicle can reach in two or more steps may be searched for on the graph structure indicating the road relationship indicated by the node and the edge. The number of steps used at the time of this search may be determined by a default value or may be dynamically determined from the position estimation accuracy of the GNSS.

In addition, the host vehicle position search unit 530 may select an intersection within a range of a circle with the second host vehicle position as the center instead of searching for the intersection to be searched for by the number of steps on the graph structure. A radius of the circle may be determined by a default value, or may be dynamically determined from the position estimation accuracy of the GNSS.

In addition, the host vehicle position search unit 530 may search for the third host vehicle position from the plurality of intersections present in front of the second host vehicle position. Similarly to the case where the host vehicle position determination unit 520 determines whether the host vehicle position is correct or incorrect based on the consistency between the plurality of intersections, the host vehicle position search unit 530 also searches for the third host vehicle position from a plurality of pieces of intersection information when the third host vehicle is searched for. With such an operation, even in a case where there are many intersections of different types around the host vehicle, the host vehicle position search unit 530 can more correctly estimate the third host vehicle position.

In addition, the host vehicle position search unit 530 may retain the result of the intersection shape estimation unit 400 and the result of the reliability determination unit 510 at not only the intersection present in front of the host vehicle but also the plurality of intersections that pass in the past, and may search for the third host vehicle position together with the time-series information in the past.

(Operation Example of Host Vehicle Position Storage Unit 540)

The host vehicle position storage unit 540 illustrated in FIG. 9 can store the first host vehicle position, the second host vehicle position determined by the host vehicle position determination unit 520, and the third host vehicle position searched for by the host vehicle position search unit 530 together with the time-series information in the past in which the host vehicle travels. Thus, in a case where it can be grasped that the road on which the host vehicle is currently traveling is near the road on which the host vehicle travels in the past by using the information such as the GNSS, the intersection consistency determination unit 500 can determine the consistency of the intersection by using the information on the host vehicle position read from the host vehicle position storage unit 540.

<Hardware Configuration of Information Processing Device>

Next, a hardware configuration of a computing device 90 constituting the information processing device 1 will be described.

Figure 24:
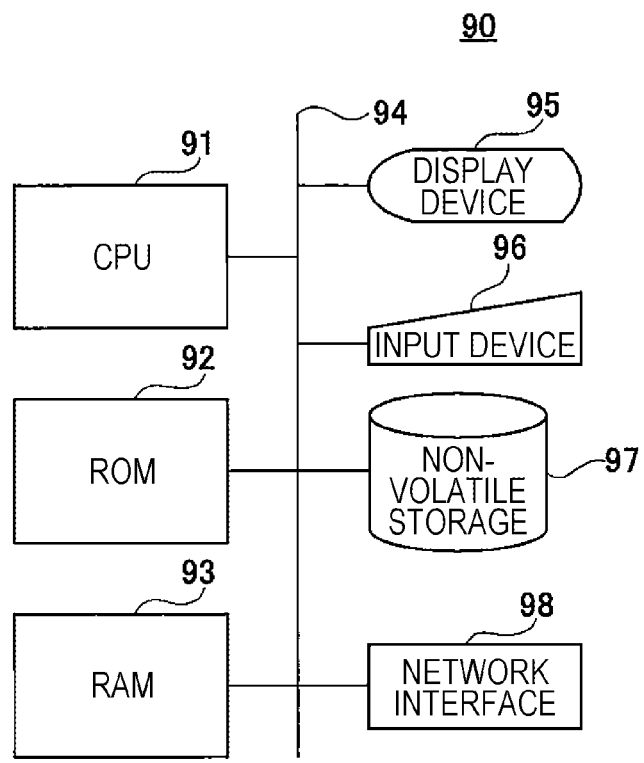
FIG. 24 is a block diagram illustrating a hardware configuration example of a computing device constituting the information processing device according to the embodiment of the present invention.

FIG. 24 is a block diagram illustrating a hardware configuration example of the computing device 90. The computing device 90 is an example of hardware used as a computer operable as the information processing device 1.

The computing device 90 includes a central processing unit (CPU) 91, a read only memory (ROM) 92, and a random access memory (RAM) 93 which are connected to a bus 94. Further, the computing device 90 further includes a display device 95, an input device 96, a non-volatile storage 97, and a network interface 98.

The CPU 91 reads out, from the ROM 92, a program code of software that implements each function according to the present embodiment, loads the program into the RAM 93, and executes the loaded program. Variables, parameters, and the like generated during arithmetic processing of the CPU 91 are temporarily written to the RAM 93, and these variables, parameters, and the like are appropriately read out by the CPU 91. However, a micro processing unit (MPU) may be used instead of the CPU 91. The processing of each functional unit performed in the information processing device 1 is performed by the CPU 91.

The display device 95 is, for example, a liquid crystal display monitor, and displays results of processing performed by the computing device 90 to a driver. For example, a keyboard, a mouse, and the like are used as the input device 96, and the driver can perform predetermined operation inputs and instructions. In addition, the display device 95 and the input device 96 may be integrated as a touch panel display. The display device 95 and the input device 96 correspond to the display, warning, and control unit 600 illustrated in FIG. 1. Note that, in FIG. 1, although the information processing device 1 does not include the display, warning, and control unit 600, the information processing device 1 may include the display, warning, and control unit 600.

As the non-volatile storage 97, for example, an HDD, an SSD, a flexible disk, an optical disk, a magneto-optical disk, a CD-ROM, a CD-R, a magnetic tape, a non-volatile memory, or the like is used. In addition to an operating system (OS) and various parameters, a program causing the computing device 90 to function is recorded in the non-volatile storage 97. The ROM 92 and the non-volatile storage 97 record programs and data necessary for the operation of the CPU 91, and are used as examples of a non-transitory computer-readable storage medium storing the program executed by the computing device 90. Various kinds of information and data generated in the information processing device 1 are stored in the non-volatile storage 97. Note that, although the information processing device 1 does not include the map information unit 200 in FIG. 1, the information processing device 1 may include the map information unit 200.

For example, a network interface card (NIC) or the like is used as the network interface 98, and the information processing device 1 can perform wireless communication via the network interface 98, can upload data to an external server via the Internet or the like, and can download data from the server. In addition, the information processing device 1 can access an in-vehicle network (for example, a controller area network (CAN)) via the network interface 98, can acquire the sensor information from the sensor unit 100, and can output the information on the host vehicle position to a navigation system or an automatic driving system (not illustrated).

In the information processing device 1 according to the embodiment described above, not only the sensor information of the intersection near the host vehicle but also the sensor information of the intersection distant from the host vehicle can be used to resolve inconsistency with the intersection model. At this time, since the information processing device 1 predicts the appearance of the road corresponding to the distance based on the sensor resolution characteristic and generates the intersection model, it is possible to correctly recognize the shape of the intersection where the vehicle travels.

In addition, the information processing device 1 can accurately predict the appearance of the intersection generated by the sensor information based on the sensor resolution characteristic that changes depending on the environment around the intersection and the environment around the host vehicle. As described above, since the shape of the road on which the host vehicle travels is correctly recognized, the information processing device 1 can output the correct shape of the road even in a complicated scene around a general road or an intersection. Thus, the driver or the automatic driving device can cause the host vehicle to travel safely by using the recognition result.

In addition, the sensor resolution of the sensor unit 100 currently varies depending on the environment in which the host vehicle is present. Thus, the environment information acquisition unit 311 acquires the environment information, and the sensor resolution characteristic storage unit 312 stores the sensor resolution characteristic corresponding to the environment information. Thus, for example, in a case where times are different even in the same place, the intersection information processing unit 300 can generate different intersection models based on the sensor resolution characteristic.

In addition, the intersection appearance prediction unit 320 predicts the appearance of the intersection based on the host vehicle position specified on the map by the host vehicle position specification unit 321 and the intersection information analyzed by the intersection information analysis unit 322. At this time, the model selection unit 323 selects the intersection model generated by the intersection model generation unit 330. As the intersection model, the first model as the high-resolution model and the second model as the low-resolution model are selected, or the plurality of models is switched in time series. The intersection model generation unit 330 generates the intersection model in accordance with the model selected by the model selection unit 323. Thus, an appropriate model is selected in accordance with the distance from the host vehicle position to the intersection, and is used for the processing of the intersection model generation unit 330.

In addition, the intersection model generation unit 330 can restore the intersection model having the detailed road shape with high accuracy by using, as the default value, the prescribed value defined in the Road Structure Ordinance based on the map information acquired from the map information unit 200. Thus, since the information processing device 1 correctly recognizes where the host vehicle position is on the road, for example, automatic driving or guidance of the host vehicle position by a navigation system is performed with high accuracy.

In addition, the intersection shape estimation unit 400 fits the intersection model generated by the intersection model generation unit 330 to the feature of the intersection indicated by the sensor information. The intersection shape estimation unit 400 can add the actual intersection feature to the intersection model to estimate the parameters of the intersection model in detail.

In addition, the intersection consistency determination unit 500 can correctly conclude the shape of the intersection present in front of the host vehicle by determining consistency between the intersection model used to estimate the intersection shape and the sensor information.

In addition, the intersection consistency determination unit 500 can re-specify the host vehicle position specified at an incorrect position in a situation where there are the plurality of intersections having similar shapes around the host vehicle at a correct position by using the information on the intersection present distant from the host vehicle for the locator.

Modification Example

Note that, in a case where the sensor information of the sensor unit 100 includes information capable of reproducing the shape of the intersection, the sensor information of the sensor unit 100 may be input to the intersection consistency determination unit 500 without passing through the intersection shape estimation unit 400 (connection form indicated by a broken line in FIG. 1). In this case, in the information processing device 1, the intersection model is input from the intersection information processing unit 300 to the intersection consistency determination unit 500. The intersection consistency determination unit 500 can also determine the consistency of the intersection indicated by the map information based on the intersection model and the sensor information input from the sensor unit 100. However, the information processing device 1 may appropriately select processing of performing the sensor information with the intersection model without passing through the intersection shape estimation unit 400, and processing of determining consistency between the intersection model of which the shape is estimated through the intersection shape estimation unit 400 and the intersection indicated in the map information.

In addition, in the above-described embodiment, the information processing device 1 predicts the appearance of the intersection in the traveling direction of the host vehicle, generates the intersection model, and estimates the shape of the intersection. However, not only at the intersection, but also in a case where the road is curved without being branched or in a case where there is a railroad crossing the road, for example, the information processing device 1 may predict the appearance of the road, may generate the road model, and may estimate the shape of the road. In this case, the railroad crossing the road or the road of which the angle is changed as viewed from the traveling direction of the host vehicle position is recognized as the specific road. The curved road or the railroad crossing the road is also a target of the shape estimation of the road according to the present embodiment.

In addition, the information processing device 1 according to the above-described embodiment may be the in-vehicle device mounted on the vehicle, or may be a terminal device that can be detached from the vehicle and carried.

Note that, the present invention is not limited to the above-described embodiment, and various other application examples and modification examples can be acquired without departing from the gist of the present invention described in the claims.

For example, the above-described embodiment is to describe the configurations of the systems in detail in order to facilitate easy understanding of the present invention, and do not necessarily include all the described configurations. In addition, additions, the components of another embodiment can be added, removed, and substituted to, from, and into some of the components of the present embodiment.

Furthermore, control lines and information lines illustrate lines which are considered to be necessary for the description, and not all the control lines and information lines in a product are necessarily illustrated. Almost all the configurations may be considered to be actually connected to each other.

REFERENCE SIGNS LIST

1 information processing device
100 sensor unit 200 map information unit
300 intersection information processing unit
310 sensor resolution characteristic management unit
320 intersection appearance prediction unit
330 intersection model generation unit
400 intersection shape estimation unit
410 road edge recognition unit
420 lane recognition unit
430 parameter estimation unit
500 intersection consistency determination unit
510 reliability determination unit
520 host vehicle position determination unit
530 host vehicle position search unit
540 host vehicle position storage unit
600 display, warning, and control unit

The invention claimed is:

1. An information processing device which estimates a road shape of a road on which a host vehicle travels based on map information and sensor information acquired from a sensor, the information processing device comprising one or more processors configured to:
   manage a sensor resolution characteristic of the sensor, which corresponds to a distance from a host vehicle position of the host vehicle to a position where the road shape changes, wherein the position comprises a position where the road shape changes into an intersection, wherein the sensor resolution characteristic comprises a limit distance at which the sensor is able to observe a specific shape of the road;
   acquire environment information which influences the limit distance;
   read out the sensor resolution characteristic corresponding to the environment information, and outputs the sensor resolution characteristic;
   predict an appearance of the intersection corresponding to the distance based on the sensor resolution characteristic; and
   generate a road model obtained by modeling the road based on the appearance of the intersection.

2. The information processing device according to claim 1, wherein the one or more processors are configured to store, as the sensor resolution characteristic, the limit distance at which the sensor is able to observe a specific shape of the road.

3. The information processing device according to claim 1, wherein
   the one or more processors are configured to generate a first model corresponding to a specific road present in front of the host vehicle position and observed by the sensor in a case where the distance is within a predetermined value, and
   the one or more processors are configured to generate a second model corresponding to the specific road not able to be observed by the sensor in a case where the distance is larger than the predetermined value.

4. The information processing device according to claim 3, wherein
   the one or more processors are configured to specify the host vehicle position on a map included in the map information,
   the one or more processors are configured to acquire road shape information representing a shape of the road present in front of the host vehicle in a traveling direction based on the specified host vehicle position and the map information, and analyzes the road shape information, and
   the one or more processors are configured to select a model able to be generated based on the sensor resolution characteristic acquired based on the road shape information and the sensor information.

5. The information processing device according to claim 1, the one or more processors are configured to estimate a shape of the road and outputs an estimation result based on the road model and the sensor information.

6. The information processing device according to claim 5, the one or more processors are configured to output the road model in which a road shape is estimated and accuracy information related to the estimation result based on the sensor information and the road model.

7. The information processing device according to claim 6, the one or more processors are configured to determine consistency between the sensor information acquired from the sensor and the estimation result, and outputs a determination result.

8. The information processing device according to claim 7, the one or more processors are configured to determine the consistency between the sensor information and the estimation result by using the road model in which a road shape is estimated and the accuracy information and comparing the accuracy information with a predetermined threshold value.

9. The information processing device according to claim 7, the one or more processors are configured to determine the consistency between the sensor information and the estimation result by comparing a road model with a connection relationship between a road width of the road indicated by the map information and a road structure.

10. The information processing device according to claim 7, the one or more processors are configured to determine consistency between a plurality of the roads present in front of the host vehicle in a traveling direction.

11. The information processing device according to claim 7, the one or more processors are configured to store a result of consistency determination of the road on which the host vehicle has travelled in the past.

12. The information processing device according to claim 7, the one or more processors are configured to determine whether the host vehicle position is correct or incorrect based on a result of consistency determination of the road, and outputs the determination result of the host vehicle position.

13. The information processing device according to claim 12, the one or more processors are configured to search for a correct host vehicle position on the map based on the result of the consistency determination of the road in response to determining that the host vehicle position specified on a map represented by the map information is incorrect.

14. A method performed by an information processing device which estimates a road shape of a road on which a host vehicle travels based on map information and sensor information acquired from a sensor, the information processing device comprising one or more processors configured to perform the method, the method comprising:
   managing a sensor resolution characteristic of the sensor, which corresponds to a distance from a host vehicle position of the host vehicle to a position where the road shape changes, wherein the position comprises a position where the road shape changes into an intersection, wherein the sensor resolution characteristic comprises a limit distance at which the sensor is able to observe a specific shape of the road;
   acquiring environment information which influences the limit distance;

reading out the sensor resolution characteristic corresponding to the environment information, and outputs the sensor resolution characteristic;

predicting an appearance of the intersection corresponding to the distance based on the sensor resolution characteristic; and generating a road model obtained by modeling the road based on the appearance of the intersection.

15. At least one non-transitory processor readable medium comprising processor readable instructions, such that, when executed, cause one or more processors to perform an information processing device which estimates a road shape of a road on which a host vehicle travels based on map information and sensor information acquired from a sensor, the one or more processors configured to:

manage a sensor resolution characteristic of the sensor, which corresponds to a distance from a host vehicle position of the host vehicle to a position where the road shape changes, wherein the position comprises a position where the road shape changes into an intersection, wherein the sensor resolution characteristic comprises a limit distance at which the sensor is able to observe a specific shape of the road;

acquire environment information which influences the limit distance;

read out the sensor resolution characteristic corresponding to the environment information, and outputs the sensor resolution characteristic;

predict an appearance of the intersection corresponding to the distance based on the sensor resolution characteristic; and generate a road model obtained by modeling the road based on the appearance of the intersection.

* * * * *